(12) United States Patent
Knutson et al.

(10) Patent No.: US 11,707,896 B2
(45) Date of Patent: Jul. 25, 2023

(54) METHODS AND DEVICES FOR SUPPORTING OF VARIETY OF DIFFERENT PRE-CURED COMPOSITE STRINGERS

(71) Applicant: The Boeing Company, Chicago, IL (US)

(72) Inventors: Samuel J. Knutson, Charleston, SC (US); James R. Kendall, Mt. Pleasant, SC (US); Raviendra S. Suriyaarachchi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 414 days.

(21) Appl. No.: 16/802,321

(22) Filed: Feb. 26, 2020

(65) Prior Publication Data
US 2021/0260840 A1   Aug. 26, 2021

(51) Int. Cl.
*B29C 70/00*   (2006.01)
*B64C 1/00*   (2006.01)
(Continued)

(52) U.S. Cl.
CPC ............ *B29C 70/541* (2013.01); *B29C 70/44* (2013.01); *B29C 70/446* (2013.01); *B64C 1/064* (2013.01);
(Continued)

(58) Field of Classification Search
CPC ......... B29C 70/00; B29C 70/40; B29C 70/44; B29C 70/446; B29C 70/50; B29C 70/54;
(Continued)

(56) References Cited

U.S. PATENT DOCUMENTS

| 9,561,602 | B2 | 2/2017 | Jones et al. |
| 2016/0023409 | A1 | 1/2016 | Coxon et al. |

(Continued)

FOREIGN PATENT DOCUMENTS

EP   3115185 A1   1/2017

OTHER PUBLICATIONS

European Application Serial No. 21157129.4, Search Report dated Jun. 24, 2021, 11 pgs.

(Continued)

*Primary Examiner* — Jacob T Minskey
*Assistant Examiner* — Matthew Hoover
(74) *Attorney, Agent, or Firm* — Kwan & Olynick LLP

(57) ABSTRACT

Provided are methods and devices for supporting of variety of different pre-cured composite stringers after forming and prior to curing. A post-forming processing device comprises a base with a channel for receiving hat portions of different stringers. The device also comprises a support structure, at least partially extending within the channel. The support structure is configured to conform to different hat portions and to retain the shape of these hat portions. For example, the support structure is made from a flexible material, which conforms to any shape variations. In some examples, the support structure is made from a jamming material that is reshaped together with each of the pre-cured composite stringers. A post-forming processing device is used for supporting different pre-cured composite stringers while various operations are performed on these stringers, such as stringer trimming, inspection, installation of bladders and noodles, and the like.

20 Claims, 15 Drawing Sheets

(51) Int. Cl.
  *B64C 3/00* (2006.01)
  *B29C 70/54* (2006.01)
  *B29C 70/44* (2006.01)
  *B64C 1/06* (2006.01)
  *B64C 1/12* (2006.01)
  *B64C 3/18* (2006.01)
  *B64C 3/26* (2006.01)
  *B29D 99/00* (2010.01)
  *B29L 31/30* (2006.01)

(52) U.S. Cl.
  CPC ........... *B64C 1/12* (2013.01); *B64C 3/182* (2013.01); *B64C 3/26* (2013.01); *B29D 99/0003* (2013.01); *B29D 99/0014* (2013.01); *B29L 2031/3082* (2013.01); *B29L 2031/3085* (2013.01); *B64C 2001/0072* (2013.01)

(58) Field of Classification Search
  CPC ........... B29C 70/541; B64C 1/00; B64C 1/06; B64C 1/064; B64C 1/10; B64C 1/12; B64C 3/00; B64C 3/10; B64C 3/18; B64C 3/182; B64C 3/20; B64C 3/26
  See application file for complete search history.

(56) References Cited

U.S. PATENT DOCUMENTS

2017/0348919 A1\* 12/2017 Hanks ............... B29C 70/56
2019/0176410 A1\* 6/2019 Register ............. B64F 5/10
2020/0231267 A1 7/2020 Rotter et al.

OTHER PUBLICATIONS

European Application Serial No. 21157129.4, Communication pursuant to Article 94.3, dated Feb. 21, 2023, 4 pgs.
European Office Action dated Aug. 17, 2022, Application No. 21157129.4, 7 pages.

\* cited by examiner

METHODS AND DEVICES FOR SUPPORTING OF VARIETY OF DIFFERENT PRE-CURED COMPOSITE STRINGERS

BACKGROUND

Aircraft utilize various components, such as stringers, to resist bending, torsional, shear, and direct loads. Stringers are typically formed from a lightweight composite using, e.g., a tape or fabric with fibers embedded in a resin matrix. For example, a composite layup is processed in a forming tool to define the shape. The shaped component is then transferred to a curing device for curing. Up until the curing is completed, the stringer requires sufficient support to retain its shape. This shape is often defined by in-plane and/or out-of-plane bends in addition to cross-sectional profiles that vary from one stringer to another. Furthermore, the shaped stringer may subjected to various operations, prior to the curing, such as trimming, inspection, installation of additional components, and the like. This support to the uncured stringer is typically provided by either the forming tool or the curing tool, which limits the throughput by either one of these tools and slows down the overall processing speed.

What is needed are new methods and devices for supporting of variety of different pre-cured composite stringers after forming and prior to curing.

SUMMARY

Provided are methods and devices for supporting of variety of different pre-cured composite stringers after forming and prior to curing. A post-forming processing device comprises a base with a channel for receiving hat portions of different stringers. The device also comprises a support structure, at least partially extending within the channel. The support structure is configured to conform to different hat portions and to retain the shape of these hat portions. For example, the support structure is made from a flexible material, which conforms to any shape variations. In some examples, the support structure is made from a jamming material that is reshaped together with each of the pre-cured composite stringers. A post-forming processing device is used for supporting different pre-cured composite stringers while various operations are performed on these stringers, such as stringer trimming, inspection, installation of bladders and noodles, and the like.

In some examples, a post-forming processing device for supporting pre-cured composite stringers is provided. The composite stringers comprise hat portions, having cross-sections, different among the pre-cured composite stringers. The post-forming processing device comprises a base, a support structure, and a cover. The base comprises a channel, having a channel width and a channel height. The channel width is larger than the width of the hat portions of the pre-cured composite stringers. The channel height is larger than the heights of the hat portions of the pre-cured composite stringers. The support structure at least partially extends within the channel and along a length of the channel. The support structure is configured to conform to each of the hat portions and to retain a cross-sectional shape of each of the hat portions when a corresponding one of the pre-cured composite stringers is supported by the post-forming processing device. The cover is configured to attach to the base, such that the corresponding one of the pre-cured composite stringers is positioned between the cover and the base while supported by the post-forming processing device.

Also provided is a method of fabricating a composite stringer. The method comprises forming a pre-cured composite stringer on a forming device, the pre-cured composite stringer comprising a hat portion and transferring the pre-cured composite stringer from the forming device to a post-forming processing device. The post-forming processing device comprises a base, comprising a channel, and a support structure, at least partially extending within the channel and along a length of the channel and conforming to the hat portion and retaining a cross-sectional shape of the hat portion. The method further comprises installing a bladder on the pre-cured composite stringer, while the pre-cured composite stringer is positioned on the post-forming processing device. The method comprises installing a noodle at an interface between the bladder and the pre-cured composite stringer and within a plane of the support surface of the base, while the pre-cured composite stringer is positioned on the post-forming processing device. The method further comprises transferring the pre-cured composite stringer together with the bladder and the noodle from the post-forming processing device to a curing device and curing the pre-cured composite stringer on the curing device, thereby forming the composite stringer.

In some examples, a method comprises transferring a pre-cured composite stringer, comprising a hat portion, to a post-forming processing device. The post-forming processing device comprises a base, comprising a channel, and a support structure, at least partially extending within the channel and along a length of the channel and conforming to the hat portion of the pre-cured composite stringer and retaining a cross-sectional shape of the hat portion of the pre-cured composite stringer. The method proceeds with removing the pre-cured composite stringer from the post-forming processing device and transferring an additional pre-cured composite stringer, comprising an additional hat portion, to the post-forming processing device. The support structure of the post-forming processing device conforms to the additional hat portion of the additional pre-cured composite stringer and retains a cross-sectional shape of the additional hat portion of the additional pre-cured composite stringer, different from the cross-sectional shape of the hat portion of the pre-cured composite stringer.

DETAILED DESCRIPTION

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Composite stringers and other shaped composite structures are used for many applications, such as aircraft, land vehicles, and the like. Fabrication of these composite structures involves various handling and processing of pre-cured shaped components, such as trimming, inspection, bladder installations, and such. Prior to curing, these shaped components require sufficient support to retain the shape, which can be challenging due to differences in shapes and sizes of these pre-cured components. For example, a modern aircraft uses hundreds of different composite stringers, which have different sizes, cross-sectional shapes, in-plane bends, and/or out-of-plane bends. Providing a dedicated support for each type of these composite stringers is challenging and expensive, adding to an already large number of specialized tools used in fabrication of composite stringers.

Figure 1A:
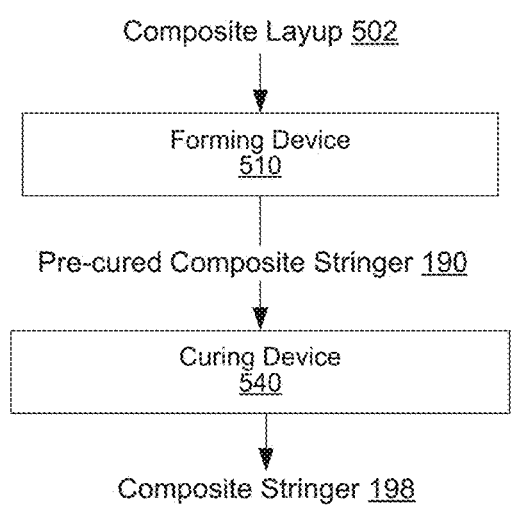
FIG. 1A a process flowchart of fabricating a composite stringer.
Figure 1B:
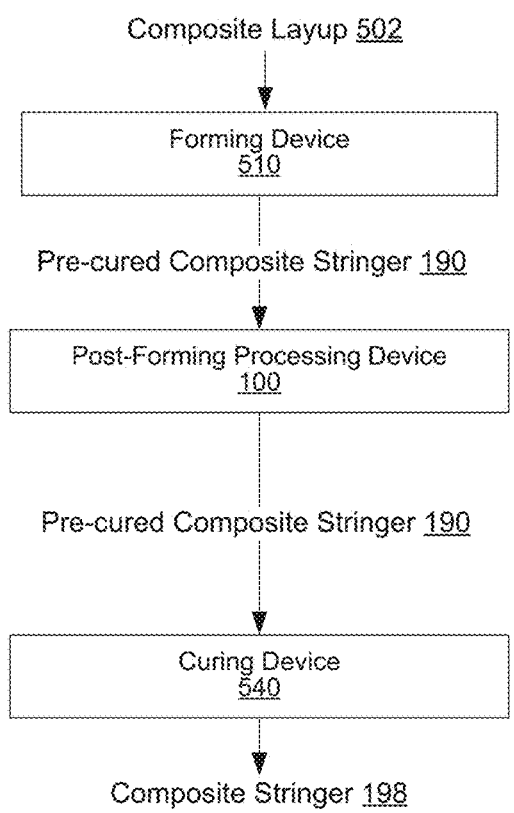
FIG. 1B is a process flowchart of fabricating a composite stringer, in accordance with other examples of the present disclosure.

FIGS. 1A and 1B illustrate two process flowcharts representing different examples of fabrication a composite stringer and corresponding tools used for various operations. FIGS. 1A and 1B are presented to provide some context and general overview of key components, tools, and steps. In both examples, the process starts with forming device 510 shaping composite layup 502, thereby forming pre-cured composite stringer 190. Curing device 540 then cures pre-cured composite stringer 190, thereby forming composite stringer 198. Pre-cured composite stringer 190 and composite stringer 198 have the generally same shape, but different material and mechanical properties. For example, the resin of pre-cured composite stringer 190 is not fully crosslinked or not as cross-inked as the resin of composite stringer 198. As such, pre-cured composite stringer 190 is still able to change the shape and requires support before curing.

Both forming device 510 and curing device 540 are specifically shaped to accommodate a particular design of composite stringer 198. Therefore, either one or both of forming device 510 and curing device 540 can be used for supporting pre-cured composite stringer 190 after completing the forming operation and before initiating the curing operation, which corresponds to the example shown in FIG. 1A. However, this approach occupies one or both forming device 510 and curing device 540 for operations that are not core functions of these devices. Furthermore, many of these operations and even storage of pre-cured composite stringer 190 may take significant periods of time. As a result, the throughput of one or both forming device 510 and curing device 540 can be limited by these intermediate operations and storage associated with pre-cured composite stringer 190.

Referring to FIG. 1B, post-forming processing device 100 is used to receive pre-cured composite stringer 190 after pre-cured composite stringer 190 is formed/shaped. Post-forming processing device 100 is also used to support pre-cured composite stringer 190 up until the curing operation. Post-forming processing device 100 effectively relieves forming device 510 and curing device 540, increasing their processing throughputs. Post-forming processing device 100 is used for various operations, performed on pre-cured composite stringer 190, and, in some examples, for storing pre-cured composite stringer 190.

However, if a post-forming processing device is specifically and permanently shaped for accommodating the shape of each specific composite stringer, then the numbers of such post-forming processing devices would be the same as the number of different stringers. This approach is not desirable from a space and cost savings perspective and can complicate the overall process by requiring a large number of additional tools. Furthermore, post-forming processing devices, which are specifically and permanently shaped, may not be always stackable due to the design variations, which complicates their storage. It should also be noted that the supply base is limited based on complexity of the post-forming processing device. Also, 3-D geometry increases complexity for shuttling the stringers around. Finally, 3-D geometry likely increases weight which will inhibit manual handling for a variety of reasons including maintenance.

Figure 1C:
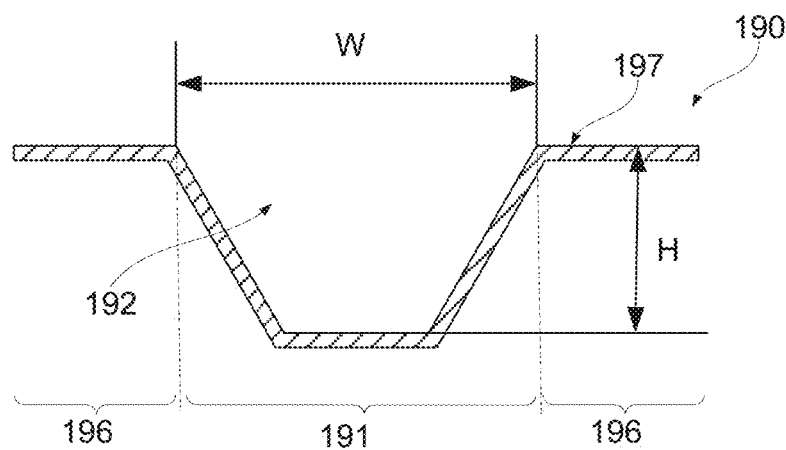
FIGS. 1C, 1D, and 1E are different examples of composite stringers.
Figure 1D:
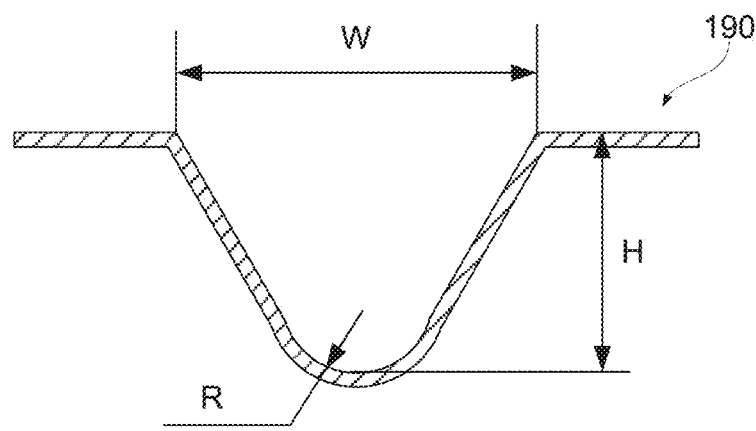
Figure 1E:
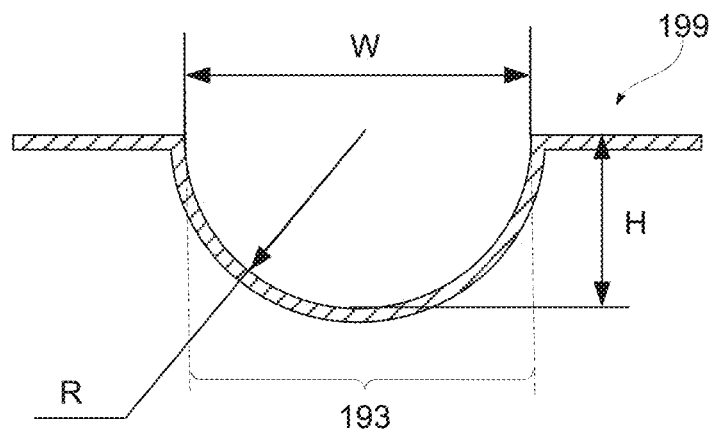

Design variations of composite stringers or, more specifically, different examples of pre-cured composite stringer 190 are shown in FIGS. 1C, 1D, and 1E. In each example, pre-cured composite stringer 190 comprises flange portions 196, which define contact surface 197. Contact surface 197 is used for connecting the composite stringer, formed from pre-cured composite stringer 190, to other components, e.g., a composite skin of an aircraft. These other components define the shape of contact surface 197. In some examples, contact surface 197 is planar. Alternatively, contact surface 197 and, more generally, the entire stringer has an out-of-plane bend.

Each of pre-cured composite stringers 190 also comprises hat portion 191, which interconnects and is positioned between flange portions 196. Hat portion 191 extends away from contact surface 197, defining stringer cavity 192. Hat portion 191 is defined by the height (H) of hat portion 191, which is defined as a maximum deviation from contact surface 197. Hat portion 191 is also defined by the width (W) of hat portion 191, which is defined as the gap between flange portions 196.

Referring to FIG. 1C, in some examples, hat portion 191 is formed by straight walls. Alternatively, in some examples, hat portion 191 is formed by a continuous curved wall, e.g., as shown in FIG. 1E. FIG. 1D illustrates an example where hat portion 191 is formed by a combination of straight and curved walls. FIGS. 1C, 1D, and 1E illustrate that pre-cured composite stringers 190, shown in these figures, require different types of support from post-forming processing device 100. Furthermore, FIGS. 1C, 1D, and 1E illustrate that pre-cured composite stringers 190 are not stackable. Therefore, if permanently-rigid supports are used for these pre-cured composite stringers, these supports will not be stackable either. For purposes of differentiating pre-cured composite stringers, an example shown in FIG. 1E may be referred to as additional pre-cured composite stringers 199.

Processing different types of pre-cured composite stringers using the same post-forming processing device 100 is described below with reference to FIG. 4.

Described methods and devices are used for supporting of variety of different pre-cured composite stringers, such as ones shown in FIGS. 1A-1C. More specifically, the same post-forming processing device is configured to support pre-cured composite stringers with different cross-sectional profiles of their hat portions. Specifically, a post-forming processing device comprises a channel and a support structure, at least partially extending within the channel. The support structure is configured to conform to each of differently shaped hat portions the pre-cured composite stringers and to retain the shape of these hat portions while providing the support. In some example, the support structure is made from a flexible material that conforms to any shape of the hat portions. Alternatively, the support structure is made from a jamming material and is reshaped together with each of the pre-cured composite stringers.

Within examples of the present disclosure, the disclosed post-forming processing device is used for supporting different pre-cured composite stringers while various operations are performed on these stringers, such as stringer trimming, inspection, installation of bladders and noodles, and the like. Furthermore, in some examples, the disclosed post-forming processing device is used for storing pre-cured composite stringers. Overall, adding the disclosed post-forming processing device into the overall process flow allows increasing processing throughputs of other devices, such as forming devices and curing devices. Overall, the disclosed post-forming processing devices provide high rate automation of stringer installation by merging the gap between forming and curing devices with these post-forming processing devices.

The described methods also incorporate alignment fittings to ensure the proper alignment between the stringer and the bladder for dead end fittings. Offset of the bladder helps to provide proper support and functionality during cure. For example, in some instances, a bladder is terminated inside of the edge of the part. Specific examples include door structures, window structures, and convergence structures (e.g., aircraft structures with pointy ends).

It should be noted that the cavity is tools used for forming stringer, accommodate both a stringer and a bladder. If the bladder does not extend past the stringer, the bladder will either interfere or leave an unacceptably large gap inside the tool. Since the bladder is aligned and locked to the stringer at the kitting stage, it is beneficial for that the bladder be indexed in the correct position to avoid rework at later stages.

Additionally, some bladders receive one or more layers of material wrapped around these bladders prior to insertion to corresponding stringers. In some examples, this assembly includes a glass ply, aligned to the end of the stringers to add the corrosion protection inside the stringer. In other examples, this assembly includes a carbon wrap, which adds strength to the stringer. In these later examples, the bladder wrap is aligned with the stringer.

Examples of Post-Forming Processing Device

Figure 2A:
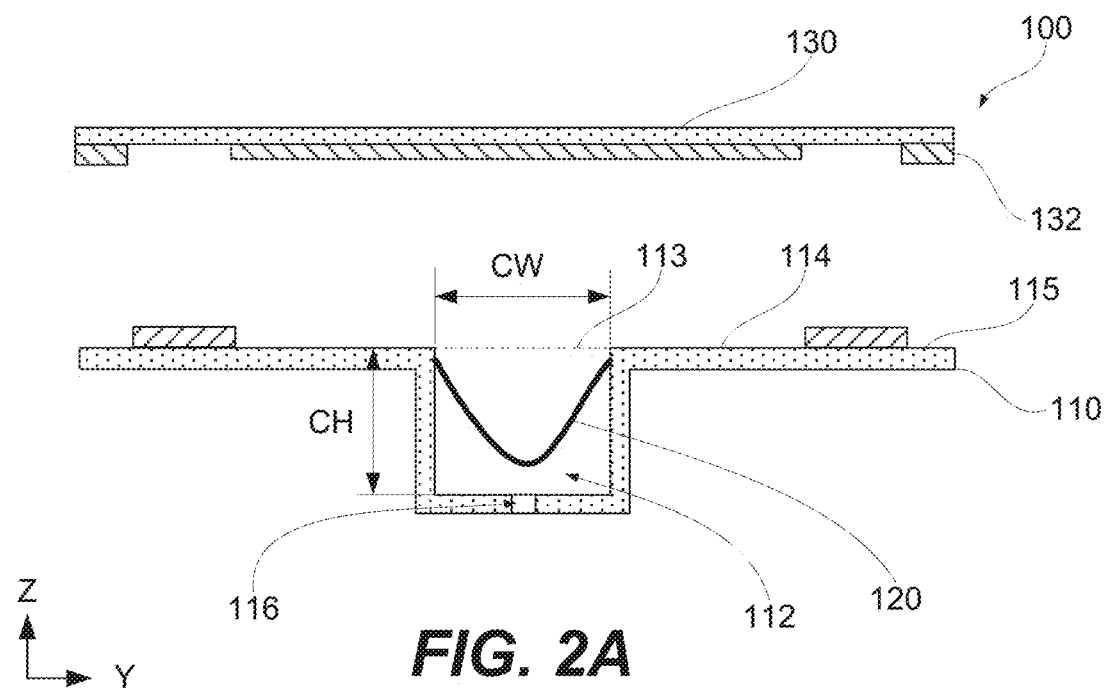
FIG. 2A is a schematic cross-sectional view of a post-forming processing device, comprising a flexible support structure, in accordance with some examples of the present disclosure.

FIG. 2A is a schematic cross-sectional view of post-forming processing device 100 for supporting pre-cured composite stringers 190, in accordance with some examples. Post-forming processing device 100 comprises base 110, support structure 120, and, optionally, cover 130. In some examples, post-forming processing device 100 does not have or, at least, is used in some operations without cover 130.

Base 110 is formed from a rigid material, such as carbon fiber, aluminum, a pultruded polyester/glass solution, and the like. Base 110 comprises support surface 114, which faces cover 130, when cover 130 is present. Support surface 114 is configured to seal against cover 130 and, in some examples, comprises one or more sealing features. During the operation of post-forming processing device 100, support surface 114 is used to support flange portions 196 of stringer 190, e.g., by compressing flange portions 196 between support surface 114 and cover. In some examples, support surface 114 is planar. In general, support surface 114 conforms to the shape of flange portions 196 of stringer 190.

Base 110 also comprises channel 112, partially extending through base 110 and having opening 113. Opening 113 separates two portions of support surface 114. As shown in FIG. 2A, channel 112 has a channel width (CW) and a channel height (CH). The channel width (CW) is measured in the direction parallel to support surface 114 (along the Y axis). The channel height (CH) is measured in the direction perpendicular to support surface 114 (along the Z axis). In some examples, the channel width (CW) is constant along the length (the X axis (see, e.g., FIG. 2F)) of base 110. In the same or other examples, the channel height (CH) is constant along the length (the X axis) of base 110. In some examples, the channel width (CW) is constant along the channel height (the Z axis) as, for example, shown in FIG. 2A. This type of channel 112 may be referred to as a straight channel. Alternatively, the channel width (CW) differs along the channel height (the Z axis) as, for example, shown in FIG. 2E. In this example, the channel width (CW) is the greatest at opening 113. This type of channel 112 may be referred to as a tapered channel and allows for stacking post-forming processing device 100.

Figure 2B:
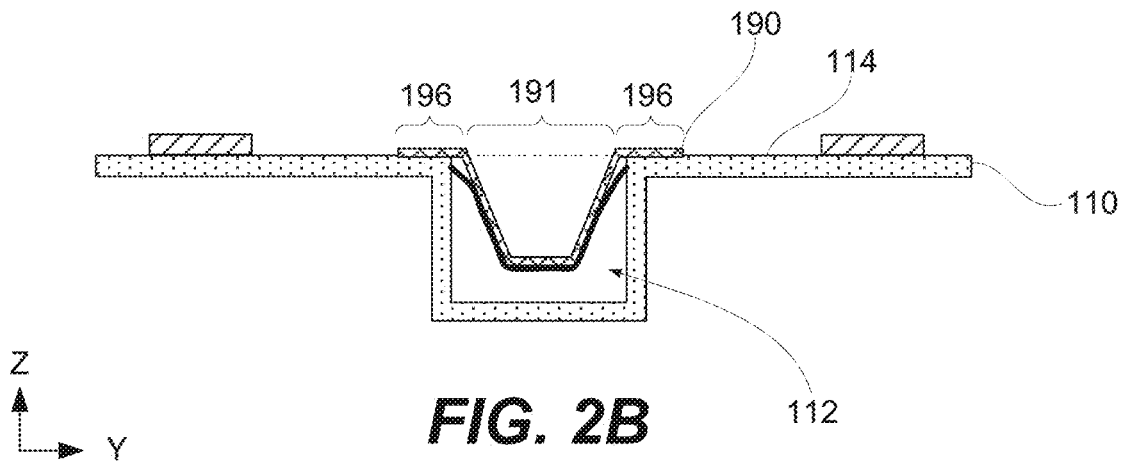
FIG. 2B is a schematic cross-sectional view of the post-forming processing device in FIG. 2A, showing the flexible support structure conforming to the hat portion of a pre-cured composite stringer, in accordance with some examples of the present disclosure.

Channel 112 is used to accommodate hat portion 191 of pre-cured composite stringer 190 when pre-cured composite stringer 190 is supported using post-forming processing device 100. Referring to FIG. 2B, hat portion 191 protrudes into channel 112, while flange portions 196 rest on support surface 114. It should be noted that the same post-forming processing device 100 is used for supporting different types of pre-cured composite stringers 190, which may have different shapes and sizes of hat portions 191. As such, the channel width (CW) is larger than the width of hat portions 191 of pre-cured composite stringers 190 or, more specifically, larger than the width of the widest hat portion 191 among all pre-cured composite stringers 190, processed on post-forming processing device 100. For purposes of this disclosure, the width of hat portion 191 is defined as the largest width, e.g., when hat portion 191 has a tapered or curved cross-section. Furthermore, the channel height is larger than the height of hat portion 191 of pre-cured composite stringers 190 or, more specifically, larger than the height of the tallest hat portion 191 among all pre-cured composite stringers 190, processed on post-forming processing device 100. In general, the cross-sectional profile of channel 112 is sufficient to accommodate any hat portion 191 of stringer 190, processed using post-forming processing device 100.

Figure 2C:
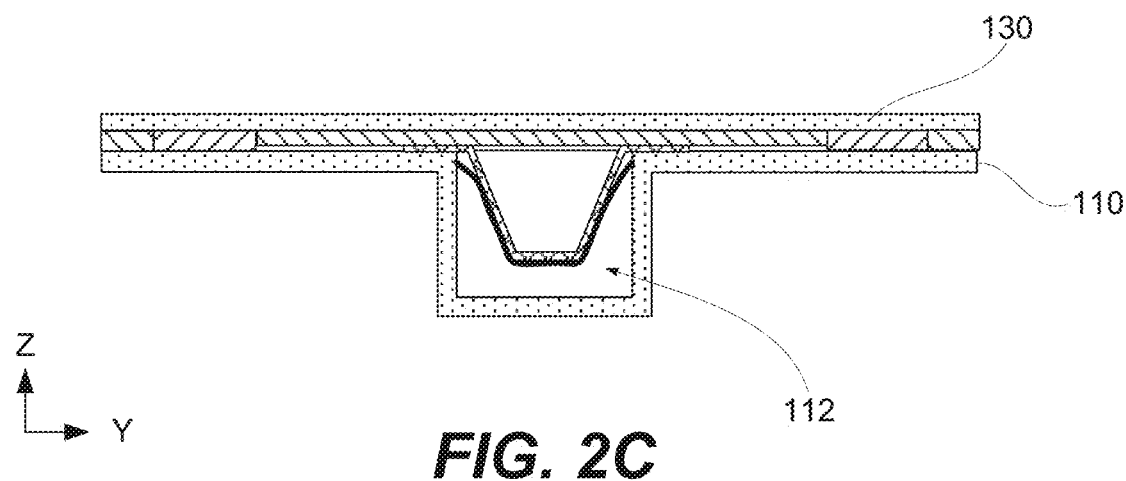
FIG. 2C is a schematic cross-sectional view of the post-forming processing device in FIGS. 2A and 2B, showing the cover sealed against the base and enclosing the pre-cured composite stringer, in accordance with some examples of the present disclosure.
Figure 2D:
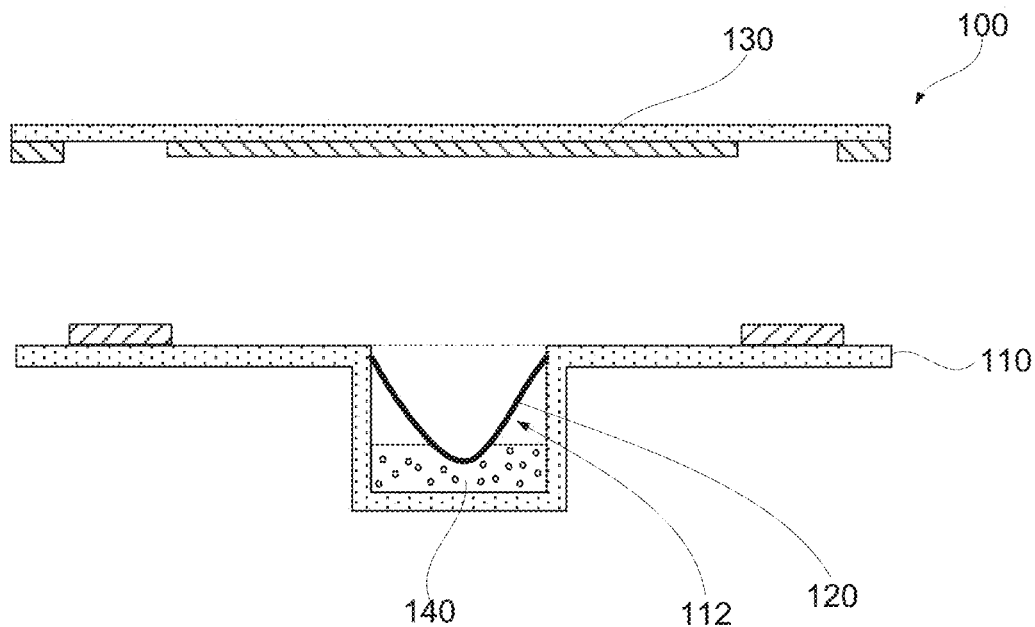
FIG. 2D is a schematic cross-sectional view of a post-forming processing device, comprising a flexible support structure and a flexible insert, both positioned in a channel, in accordance with some examples of the present disclosure.
Figure 2E:
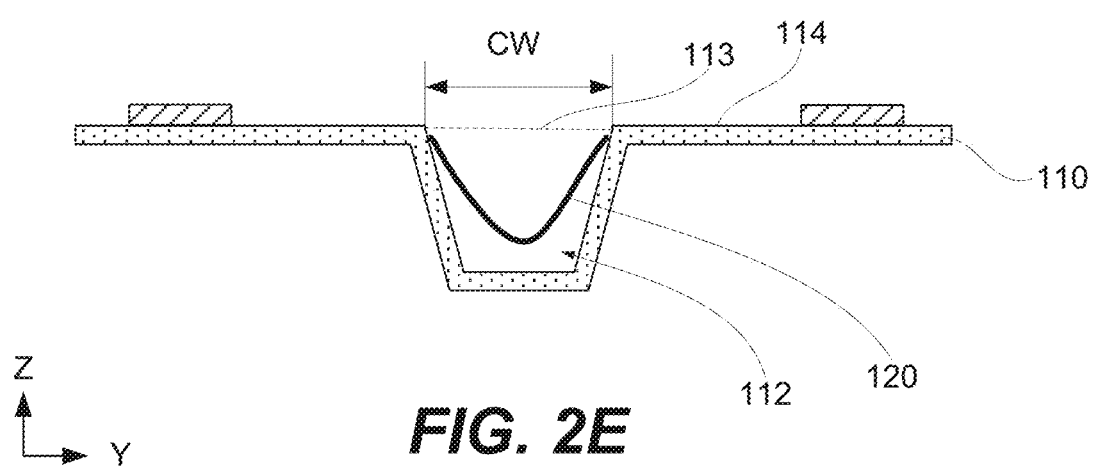
FIG. 2E is a schematic cross-sectional view of a post-forming processing device, illustrating a tapered channel, in accordance with some examples of the present disclosure.

While FIGS. 2A-2C illustrate a rectangular cross-sectional profile of channel 112, any cross-sectional profile capable of accommodating hat portions 191 of pre-cured composite stringers 190 is within the scope of the present disclosure, such as tapered profile shown in FIG. 2E, semi-circular profile, and the like. In some examples, the cross-sectional profile of channel 112 corresponds to the cross-sectional profile of hat portions 191, e.g., both are tapered.

Referring to FIG. 2A, support structure 120 at least partially extends within channel 112 and along the length of channel 112. In some examples, support structure 120 is configured to conform to each hat portion 191 and to retain the cross-sectional shape of that hat portion 191 when pre-cured composite stringers 190 is supported by and processed using post-forming processing device 100. It should be noted that the same support structure 120 is used for different types and profiles of hat portion 191. Support structure 120 is able to conform to these different types and profiles while providing sufficient support.

In some examples, support structure 120 is formed from an elastic material, configured to change the shape when conforming to different types of hat portions 191. Some examples of suitable elastic materials include, but are not limited to, latex, silicone (e.g., peroxide or platinum cured silicon), and other like materials. Some considerations for material selection includes weight, clean-ability, solvent resistance, stiffness, tear strength, elongation to failure, and hardness.

In some examples, support structure 120 is attached to base 110 at side walls of channel 112 as, e.g., is schematically shown in FIG. 1A. In these examples, support surface 114 remains exposed and available for interfacing with flange portions 196 of pre-cured composite stringers 190. In other words, support structure 120 does not interfere when flange portions 196 are positioned on support surface 114, e.g., compressed between support surface 114 and cover 130. These examples are schematically shown in FIGS. 2A and 2B.

In some examples, support structure 120 comprises a jamming material or a plastically deformable material. For purposes of this disclosure, a jamming material is defined as a material that is able to change its shape at one condition and to retain its shape at another condition. More specifically, support structure 120 is co-formed or co-shaped with one of pre-cured composite stringers 190 and then retains the shape of this stringer while supporting this stringer. For example, the shape of support structure 120 is initially different than that of pre-cured composite stringer 190. It should be noted that at this stage pre-cured composite stringer 190 is not yet formed. Both support structure 120 and a composite layup are loaded into a forming device, various examples of which are described below, and the shape of support structure 120 is adjusted, while pre-cured composite stringer 190 is being formed. Hence, support structure 120 is co-formed or co-shaped with pre-cured composite stringer 190.

This shape is retained by support structure 120 during various operation of post-forming processing device 100 while supporting this particular stringer. In some examples, the shape is retained while processing multiple stringers of the same type, e.g., the same cross-sectional shape of hat portions. When a different type of stringer is to be supported, the shape of support structure 120 is changed, e.g., by co-forming or shaping with that other stringer. These examples are schematically shown in FIGS. 3A and 3B.

Figure 3A:
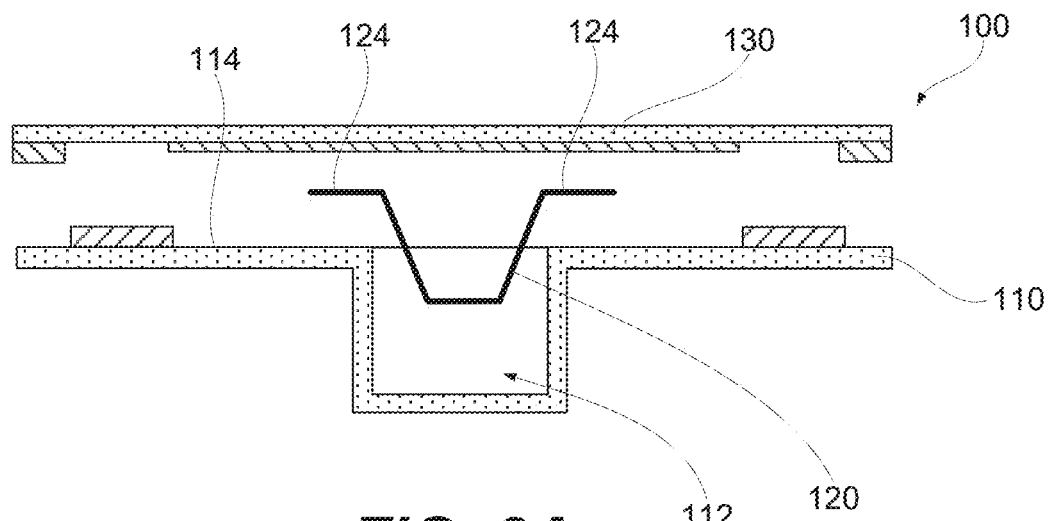
FIG. 3A is a schematic cross-sectional view of a post-forming processing device, comprising a pre-formed support structure made from a jamming material, in accordance with some examples of the present disclosure.
Figure 3B:
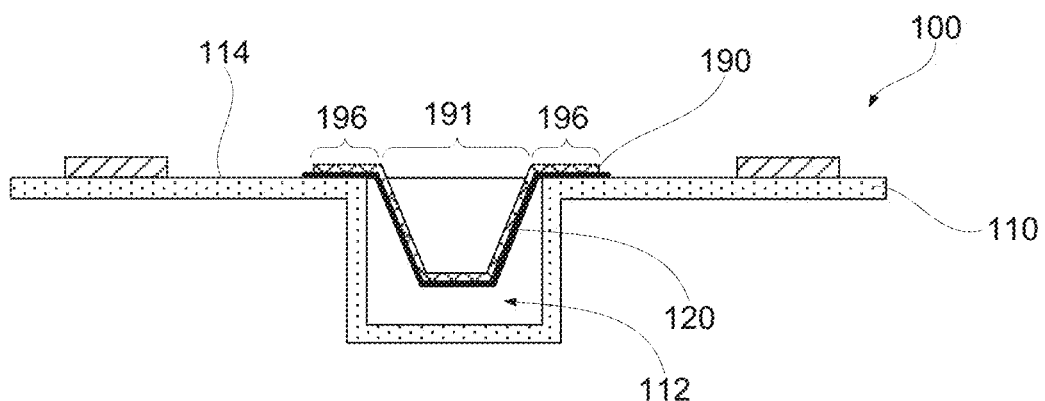
FIG. 3B is a schematic cross-sectional view of the post-forming processing device in FIG. 3A, showing the flexible support structure engaging a pre-cured composite stringer, in accordance with some examples of the present disclosure.

Referring to FIG. 3A, in some examples, support structure 120 comprises support flanges 124 extending over support surface 114 of base 110 and outside channel 112. Similar to a portion of support structure 120, extending into channel 112 and supporting hat portions 191 of stringer 190, support flanges 124 are specifically shaped to support flange portions 196 of stringer 190. In some examples, the shape of support flanges 124 is different from the shape of support surface 114. Therefore, the same post-forming processing device 100 may be used for supporting stringers with different shapes of flange portions.

In some examples, support structure 120 is removable from base 110. For example, support structure 120 is removed from base 110 to change the shape of support structure 120, e.g., when support structure 120 is formed from a jamming material. In some examples, different types of support structure 120 are used with the same base 110.

Figure 3C:
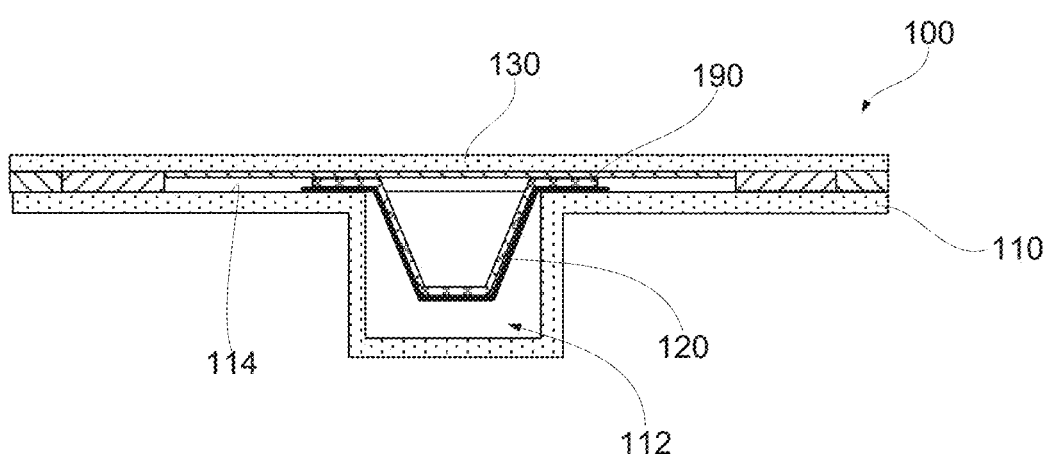
FIG. 3C is a schematic cross-sectional view of the post-forming processing device in FIGS. 3A and 3B, showing the cover sealed against the base and enclosing the pre-cured composite stringer, in accordance with some examples of the present disclosure.

Cover 130 is configured to attach to base 110, such that the corresponding one of pre-cured composite stringers 190 is positioned between cover 130 and base 110 while supported by post-forming processing device 100. More specifically, flange portions 196 of pre-cured composite stringer 190 are positioned and, in some examples, are compressed between cover 130 and support surface 114 as, for example, is schematically shown in FIG. 3C. Cover 130 is configured to seal against base 110. Specifically, cover 130 comprises vacuum seal 132, which engages seal receiver 115.

In some examples, base 110 comprises pass-through 116, fluidically coupled with channel 112 and configured to control pressure inside channel 112 and under support structure 120. For example, pass-through 116 is used to maintain the pressure under support structure 120 to be the same as in the environment, e.g., when hat portion 191 of pre-cured composite stringer 190 is inserted into channel 112 and engages support structure 120 or, more specifically, when hat portion 191 pushes support structure 120 deeper into channel 112 thereby reducing the volume under support structure 120.

In some examples, post-forming processing device 100 further comprises flexible insert 140 as, e.g., shown in FIG. 2D. Flexible insert 140 is positioned with channel 112 and under support structure 120 and is used to provide additional support to hat portion 191. Flexible insert 140 allows using support structure 120 that are very flexible and able to conform to a larger variation of hat portion 191 than, for example, when support structure 120 is used without flexible insert 140. In some examples, flexible insert 140 is made from an elastomeric rubber, such as MOSITES® rubber, latex, or something similar.

Figure 2F:
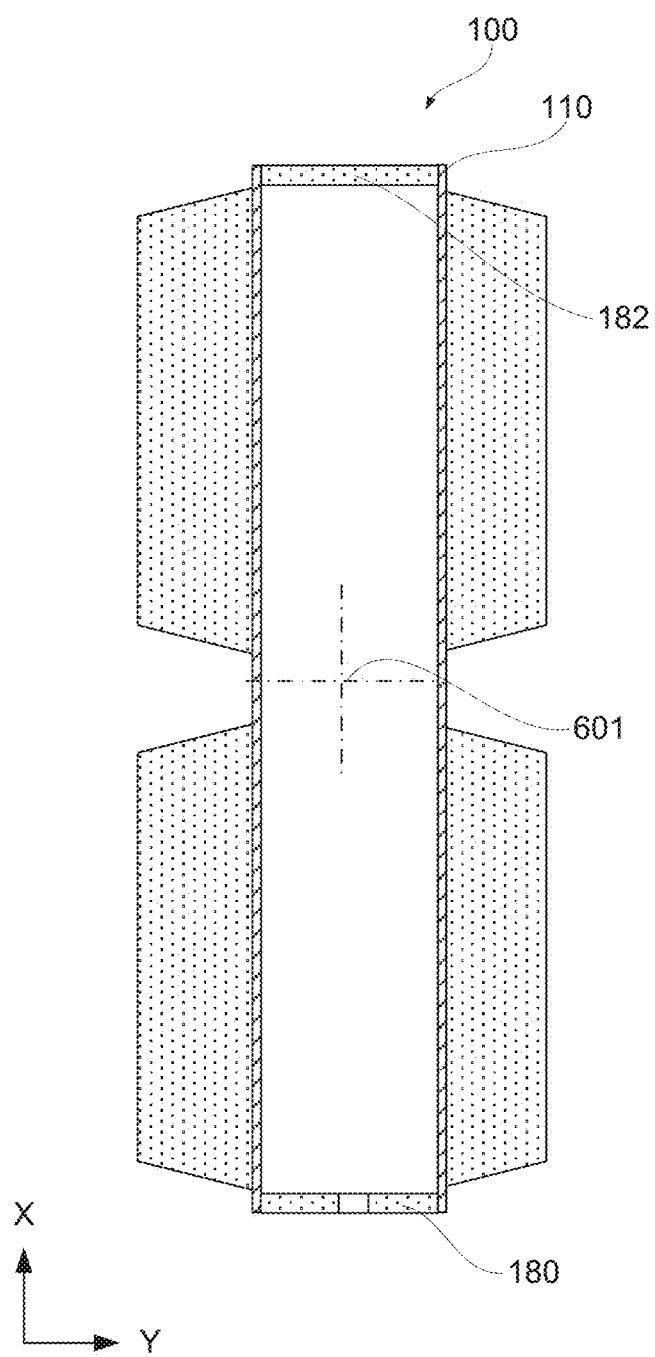
FIG. 2F is schematic top view of a post-forming processing device, illustrating bladder seals, in accordance with some examples of the present disclosure.

Referring to FIG. 2F, in some examples, post-forming processing device 100 comprises pass-through bladder seal 180 and dead end bladder seal 182. It should be noted that bladder 520, which is further described below with reference to FIGS. 5D-E, is a tube made, e.g., from silicone, VITON®, or other like materials. In some examples, the material of bladder 520 is reinforced or layered. During processing, bladder 520 is vented to the autoclave atmosphere during cure and vented to the ambient atmosphere during any compaction/vacuum bag. As such, in some examples, one end of bladder 520 comprises a fitting with a vent hole. Pass-through bladder seal 180, shown in FIG. 2F, connects this fitting allowing bladder 520 to vent, when bladder 520 is inside post-forming processing device 100. In some examples, post-forming processing device 100 comprises pass-through bladder seals on both ends.

Examples of Methods of Fabricating Composite Stringer

Figure 4:
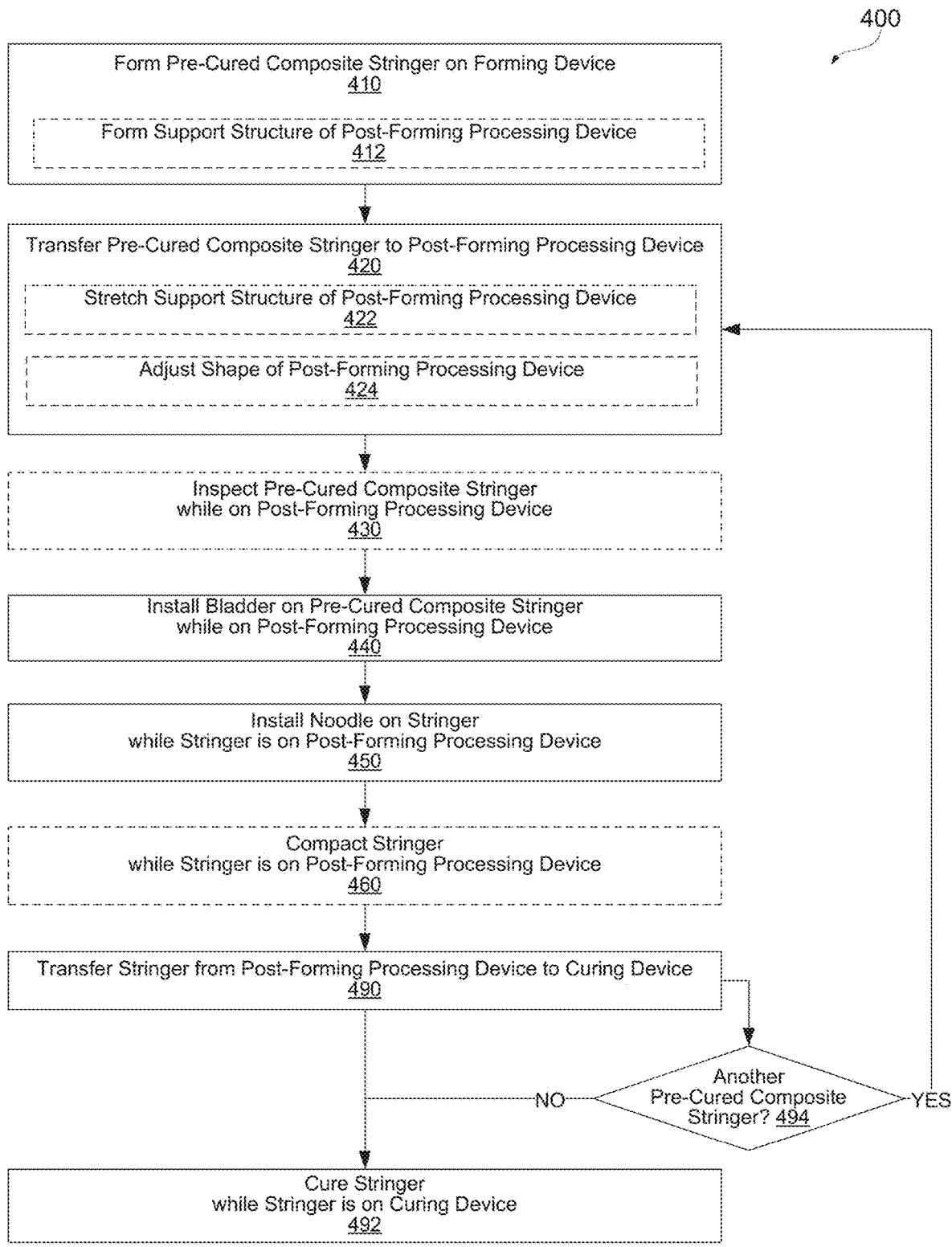
FIG. 4 is a process flowchart corresponding to a method of fabricating a composite stringer, in accordance with some examples of the present disclosure.

FIG. 4 is a process flowchart corresponding to method 400 of fabricating composite stringer 198, see, e.g., FIG. 1B, in accordance with some examples. Composite stringer 198 should be differentiated from pre-cured composite stringer 190, which is an intermediate structure used to form composite stringer 198. As such, in some examples, pre-cured composite stringer 190 and composite stringer 198 have the same size and shape. Therefore, FIGS. 1C-1E are representative of both pre-cured composite stringer 190 and composite stringer 198. In some examples, composite stringer 198 comprises a fiber reinforced composite material, which may be also referred to as a reinforced composite material. This type of material comprises one or more non-homogeneous polymer-based components and one or more non-polymeric based components (e.g., carbon-fibers). Method 400 is described in greater detail below with reference to FIG. 4 and FIGS. 5A-H.

Method 400 comprises forming (block 410) pre-cured composite stringer 190, e.g., using composite layup 502. This operation is performed using forming device 510 (shown in FIGS. 5A and 5B), which is different from post-forming processing device 100, used in later operation (shown in FIGS. 5C-5F). As noted above, post-forming processing device 100 increases throughput of forming device 510 since various later operations are performed using post-forming processing device 100.

In some examples, composite layup 502 comprises an uncured pre-impregnated reinforcing tape or fabric, which may be referred to as a prepreg. The tape or fabric comprises fibers, such as graphite fibers, embedded within a matrix material, such as a polymer or, more specifically, an epoxy or phenolic resin. In some examples, the tape or fabric is unidirectional or woven depending on the design and the degree of reinforcement desired in the resulting composite stringer 198.

Figure 5A:
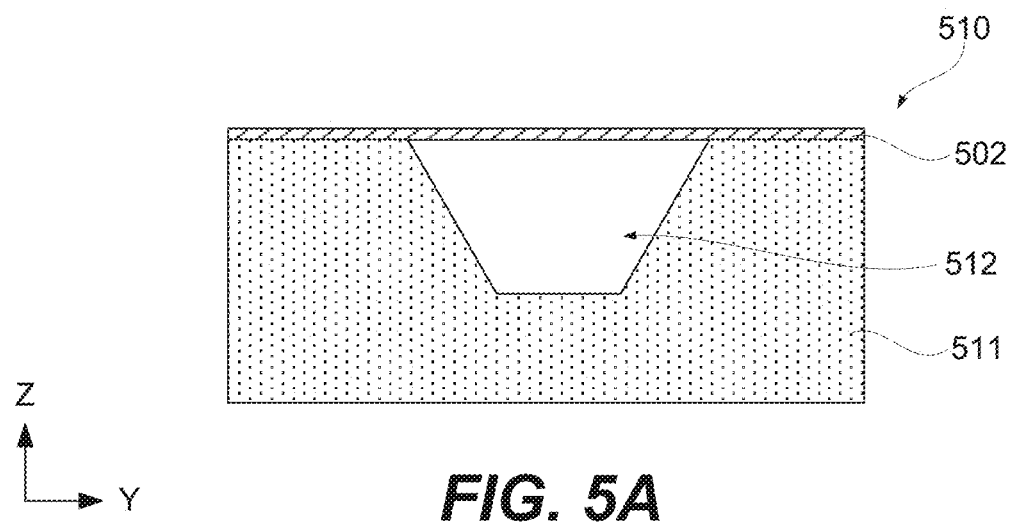
FIG. 5A is a schematic illustration of a laminated layup, disposed on a processing surface of a forming base and extending over a cavity, in accordance with some examples of the present disclosure.
Figure 5B:
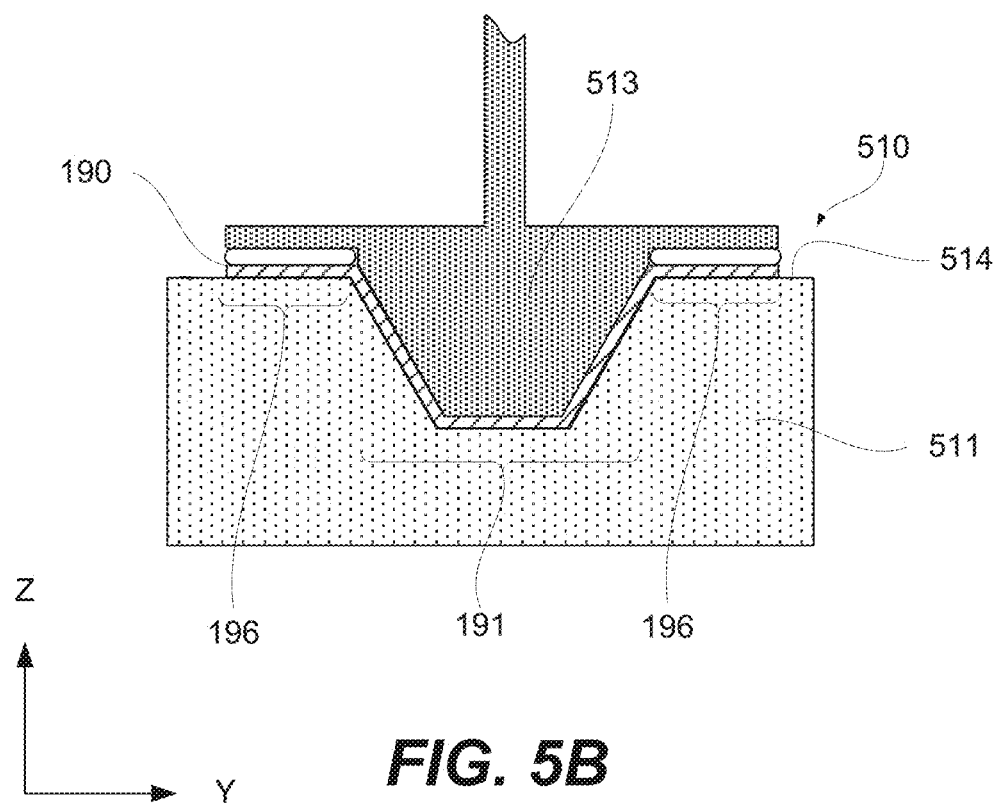
FIG. 5B is a schematic illustration of the laminated layup, shaped into a pre-cured composite stringer, by the forming device, in accordance with some examples of the present disclosure.

During the forming operation (block 410), composite layup 502 is positioned on forming device 510 as, e.g., is shown in FIG. 5A. In some examples, support structure 120 is positioned between composite layup 502 and forming device 510, e.g., when support structure 120 is co-formed together with pre-cured composite stringer 190. These examples are further described below with reference to block 412. Forming device 510 comprises forming base 511 with forming cavity 512, which defines the shape of hat portion 191 of pre-cured composite stringer. Referring to FIG. 5B, forming device 510 also comprises forming die 513, which pushes a part of composite layup 502 into forming cavity 512 and against the walls of forming cavity 512.

Upon completion of this operation, composite layup 502 is formed into pre-cured composite stringer 190. Pre-cured composite stringer 190 comprises hat portion 191, which is disposed between forming die 513 and the walls of forming cavity 512. Pre-cured composite stringer 190 also comprises flange portions 196, which extend outside of forming cavity 512 and, e.g., conform to forming surface 514 of forming base 511. In some examples, forming die 513 comprises specially configured bladders, pressing on flange portions 196. These bladders are pressurized and contact flange portions 196 prior to forming hat portion 191, in some examples to different pressure level to allow composite layup 502 to slip on forming surface 514 while hat portion 191 is being formed.

In some examples, forming pre-cured composite stringer 190 on forming device comprises forming (block 412) support structure 120 of post-forming processing device 100. For example, support structure 120 comprises a jamming material, various examples and features of which are described above. In some examples, support structure 120 is shaped in a separate operation from pre-cured composite stringer 190. Alternatively, support structure 120 and pre-cured composite stringer 190 are co-formed or co-shaped in the same overall operation, e.g., the operation represented by block 412 is a part of the operation represented by block 410, as shown in FIG. 4. In other words, support structure 120 is placed into forming device 510 together with composite layup 502. At this stage, the shape of support structure 120 is different than the shape of pre-cured composite stringer 190, which will be formed on and defined by forming device 510. For example, support structure 120 has been previously used for supporting another pre-cured composite stringer, which has a different shape. During concurrent operations represented by block 410 and block 412, pre-cured composite stringer 190 is formed while support structure 120 is also co-formed or co-shaped. This support structure forming operation (block 412) may be also referred to as a shape changing operation.

In some examples, method 400 also comprises trimming of pre-cured composite stringer 190, e.g., cutting a portion of pre-cured composite stringer 190. For example, an ultrasonic knife is used for cutting.

Figure 5C:
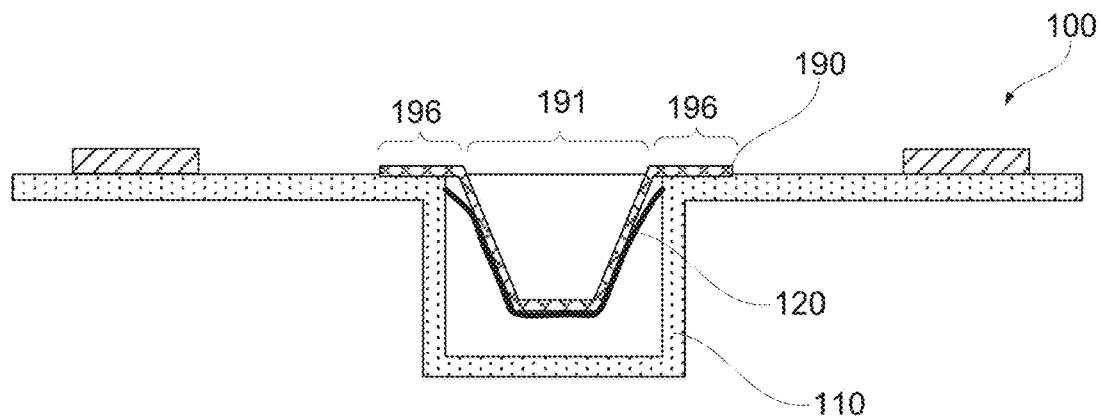
FIG. 5C is a schematic illustration of the pre-cured composite stringer, supported by a post-forming processing device, in accordance with some examples of the present disclosure.
Figure 5D:
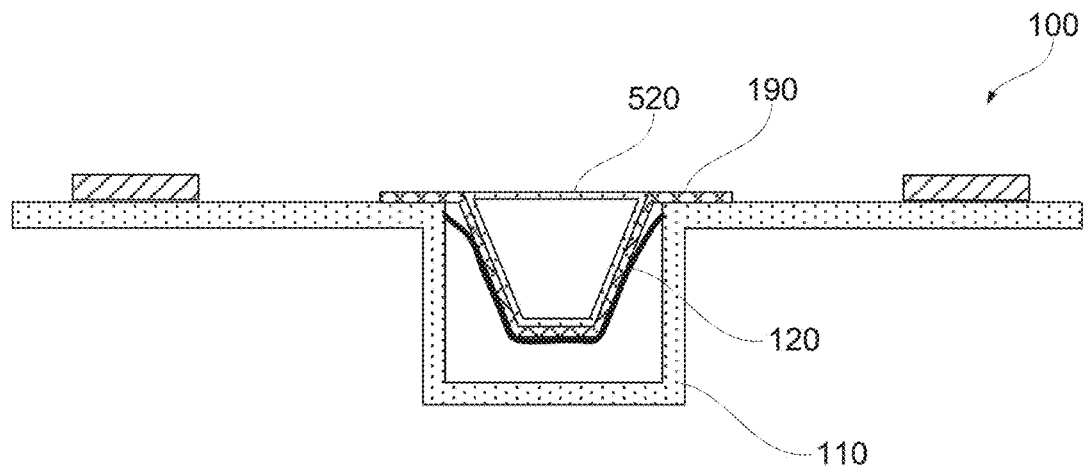
FIG. 5D is a schematic illustration of a bladder, installed into the pre-cured composite stringer, while the pre-cured composite stringer is supported by the post-forming processing device, in accordance with some examples of the present disclosure.
Figure 5E:
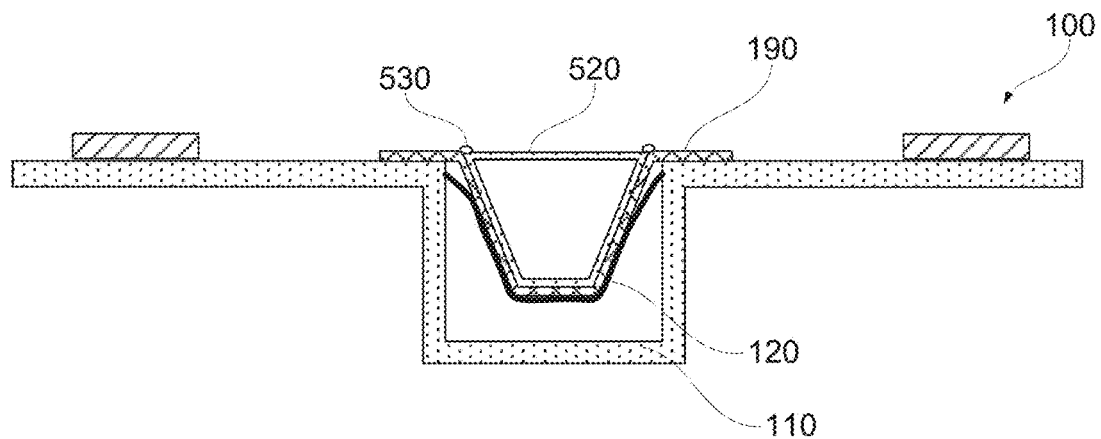
FIG. 5E is a schematic illustration of a noodle installed, at an interface between the bladder and the pre-cured composite stringer, while the pre-cured composite stringer is supported by the post-forming processing device, in accordance with some examples of the present disclosure.

Method 400 proceeds with transferring (block 420) pre-cured composite stringer 190 from forming device 510 to post-forming processing device 100. For instance, the transfer of pre-cured composite stringer 190 from forming device 510 to post-forming processing device 100 is shown in FIGS. 5B-5C. Various examples of post-forming processing device 100 are described above. In some examples, pre-cured composite stringer 190 is transferred unsupported. Alternatively, pre-cured composite stringer 190 is transferred together with support structure 120.

In some examples, the transferring operation comprises controlling pressure inside channel 112 of base 110. For example, inserting hat portion 191 of pre-cured composite stringer 190 into channel 112 may cause displacing of air from channel 112, e.g., through pass-through 116.

In some examples, the transferring operation comprises stretching (block 422) support structure 120 of post-forming processing device 100. In these examples, support structure 120 is formed from an elastic material that conforms to the shape of hat portion 191 of pre-cured composite stringer 190 as hat portion is inserted into channel 112. More specifically, the elastic material is configured to change the shape when conforming to each of hat portions 191. As noted above, in some examples, hat portions 191 have different cross-sectional shapes. This stretching feature as, e.g., is shown in FIGS. 2A-2B, of support structure 120 allows supporting pre-cured composite stringers 190 with different sizes of hat portions 191.

Figure 6A:
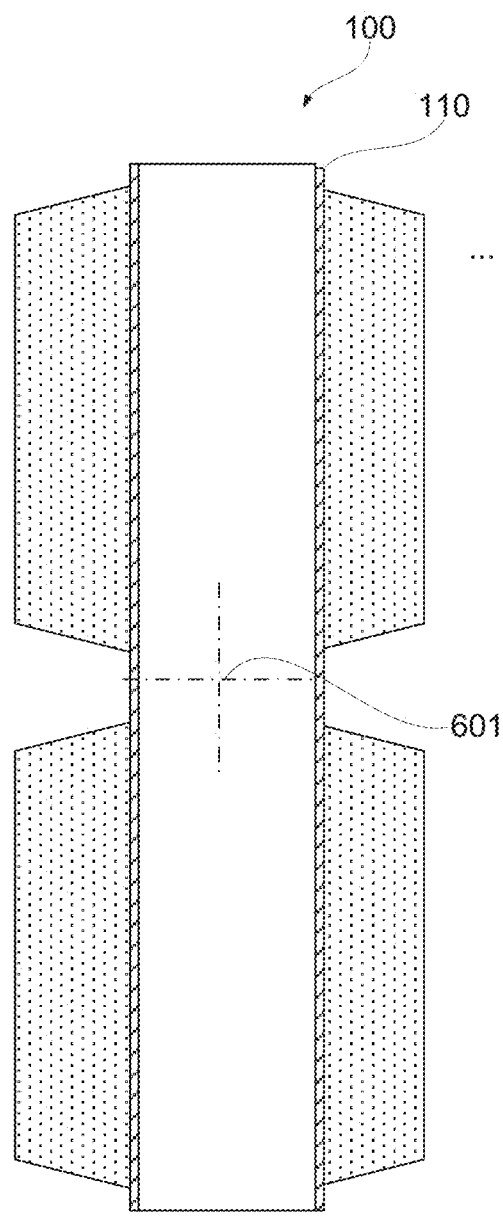
FIGS. 6A and 6B are top schematic views of a post-forming processing device, showing in-plane bending, in accordance with some examples of the present disclosure.
Figure 6B:
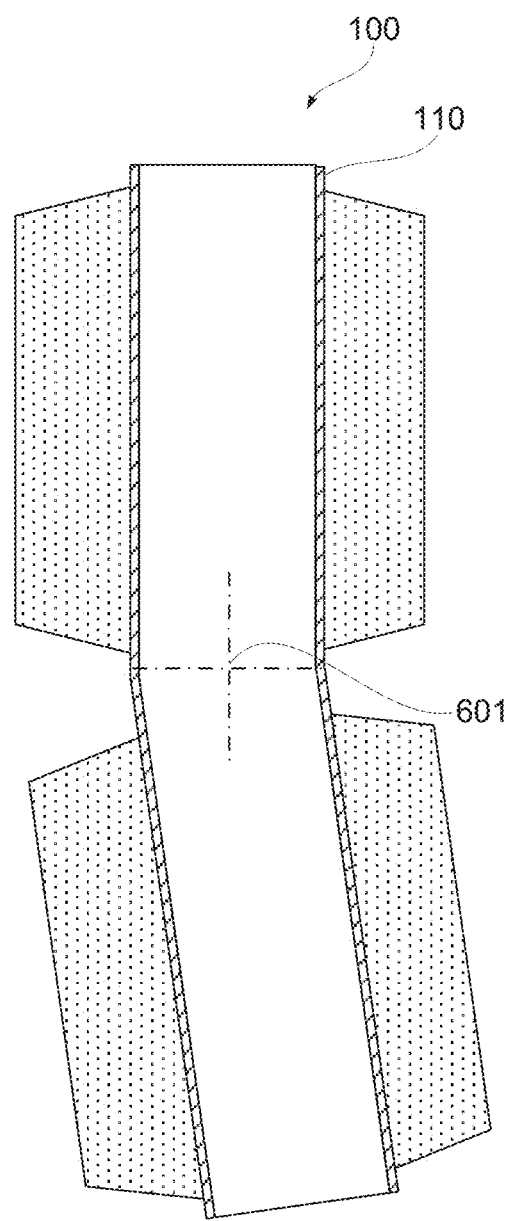

In some examples, the transferring operation comprises adjusting (block 424) the shape of post-forming processing device 100. FIGS. 6A and 6B illustrate base 110 of post-forming processing device 100, which has a pivot point, defined by first axis 601. Other components of post-forming processing device 100, such as support structure 120, are not shown for simplicity. The pivot point allows base 110 to have an in-plane bending and accommodate both straight pre-cured composite stringers (in the configuration shown in FIG. 6A) and pre-cured composite stringers with an in-plane bend (in the configurations shown in FIG. 6B). While only one pivot point is shown in FIGS. 6A and 6B, one having ordinary skill in the art would understand that any number of pivot points may be present. Furthermore, in some examples, post-forming processing device 100 has an out-of-plane bending functionality. It should be noted that some degrees of bending, especially localized bending, of pre-cured composite stringers can be accommodated by the side of channel 112 within base 110, without bending base 110.

In some examples, method 400 comprises inspecting (block 430) pre-cured composite stringer 190. The inspection is performed while pre-cured composite stringer 190 is positioned on post-forming processing device 100. For example, the inspection involves checking the surface of pre-cured composite stringer 190 for wrinkles, bubbles, foreign object debris (FOD), loose fibers, wrinkles, and shape. It should be noted that the inspection operation is performed away from forming device 510 and curing device 540, thereby allowing other pre-cured composite stringers to be processes on these devices and increasing the overall process throughput.

Method 400 comprises installing (block 440) bladder 520 on pre-cured composite stringer 190 as, e.g., schematically shown in FIG. 5D. Bladder 520 is installed while pre-cured composite stringer 190 is positioned on post-forming processing device 100. In some example, bladder 520 is wrapped into a bladder warp, which is later cured into the skin of the stringer when bladder 520 is removed. Bladder 520 is used during curing operation to provide support inside of pre-cured composite stringer 190. In some examples, bladder 520 is a solid object composed of silicone, urethane, or similar materials, including any combination thereof. In some examples, bladder 520 is shaped to substantially correspond with pre-cured composite stringer 190.

Method 400 comprises installing (block 450) noodle 530 at an interface between bladder 520 and pre-cured composite stringer 190 and within the plane of support surface 114 of base 110 as, e.g., schematically shown in FIG. 5E. This installing operation is performed while pre-cured composite stringer 190 is positioned on post-forming processing device 100. Noodle 530 is also referred to as a radius filler.

Figure 5F:
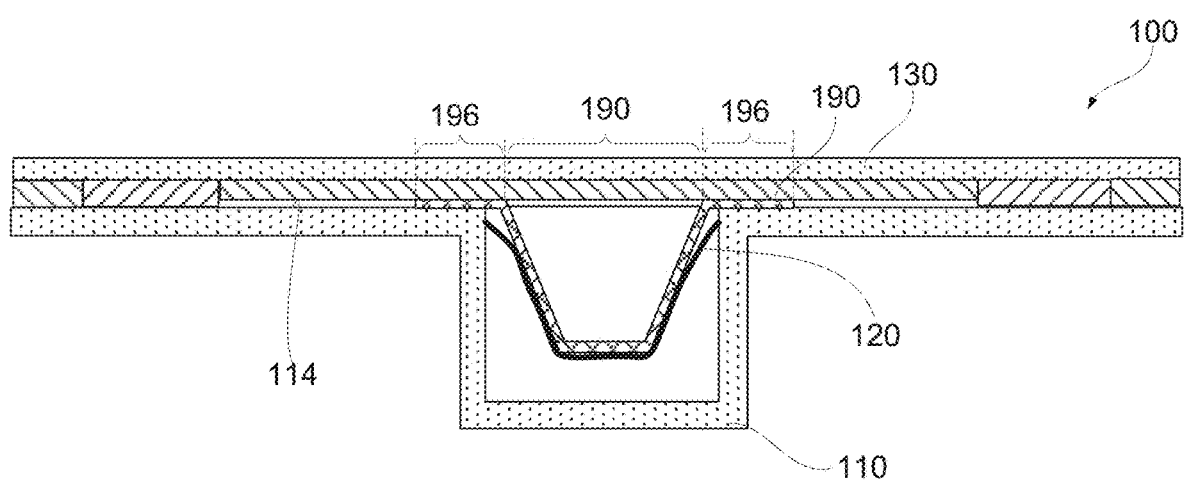
FIG. 5F is a schematic illustration of a cover sealed against the base of the post-forming processing device, in accordance with some examples of the present disclosure.

In some examples, method 400 comprises compacting (block 460) pre-cured composite stringer 190, while pre-cured composite stringer 190 is positioned on post-forming processing device 100. For example, the compacting operation involves sealing cover 130 of post-forming processing device 100 against base 110 of post-forming processing device 100 as, for example, is schematically shown in FIG. 5F. In some examples, the compacting operation further comprises contacting at least flange portions 196 of pre-cured composite stringer 190 with cover 130 of post-forming processing device 100.

In some examples, method 400 comprises staging and transporting pre-cured composite stringer 190. These operations are performed while pre-cured composite stringer 190 is positioned on post-forming processing device 100. Furthermore, post-forming processing device 100 is used for storing pre-cured composite stringer 190, while providing support to pre-cured composite stringer 190.

Figure 5H:
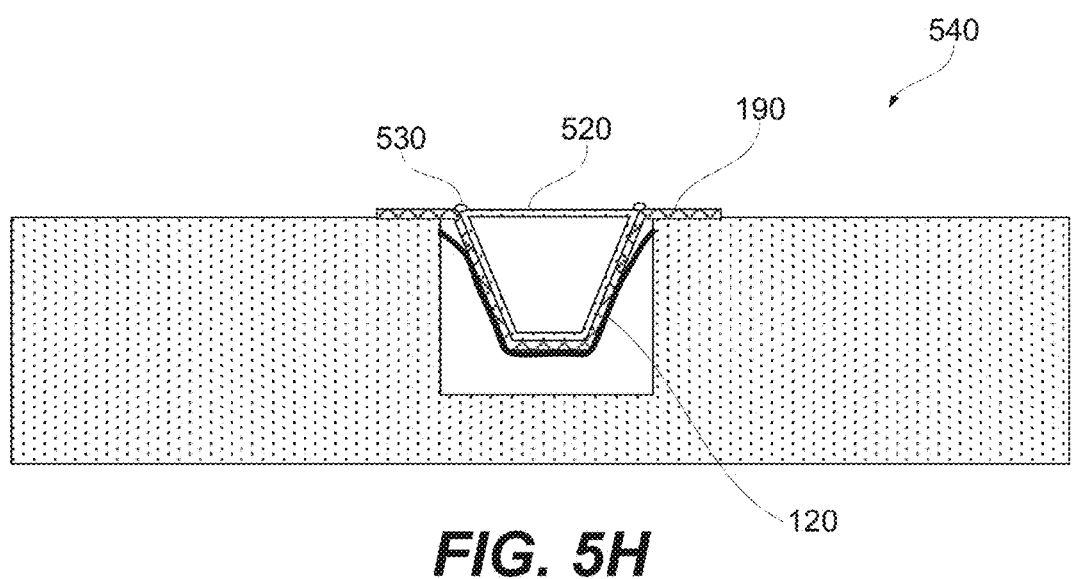
FIG. 5H is a schematic illustration of the pre-cured composite stringer transferred together with the bladder and the noodle to a curing device, in accordance with some examples of the present disclosure.

Method 400 proceeds with transferring (block 490) pre-cured composite stringer 190 from post-forming processing device 100 to curing device 540. For instance, the transfer of pre-cured composite stringer 190 from post-forming processing device 100 to curing device 540 is shown in FIG. 5F-5H. In some examples, pre-cured composite stringer 190 is transferred together with bladder 520 and/or noodle 530, which are installed onto pre-cured composite stringer 190 while pre-cured composite stringer 190 was positioned on post-forming processing device 100.

Figure 5I:
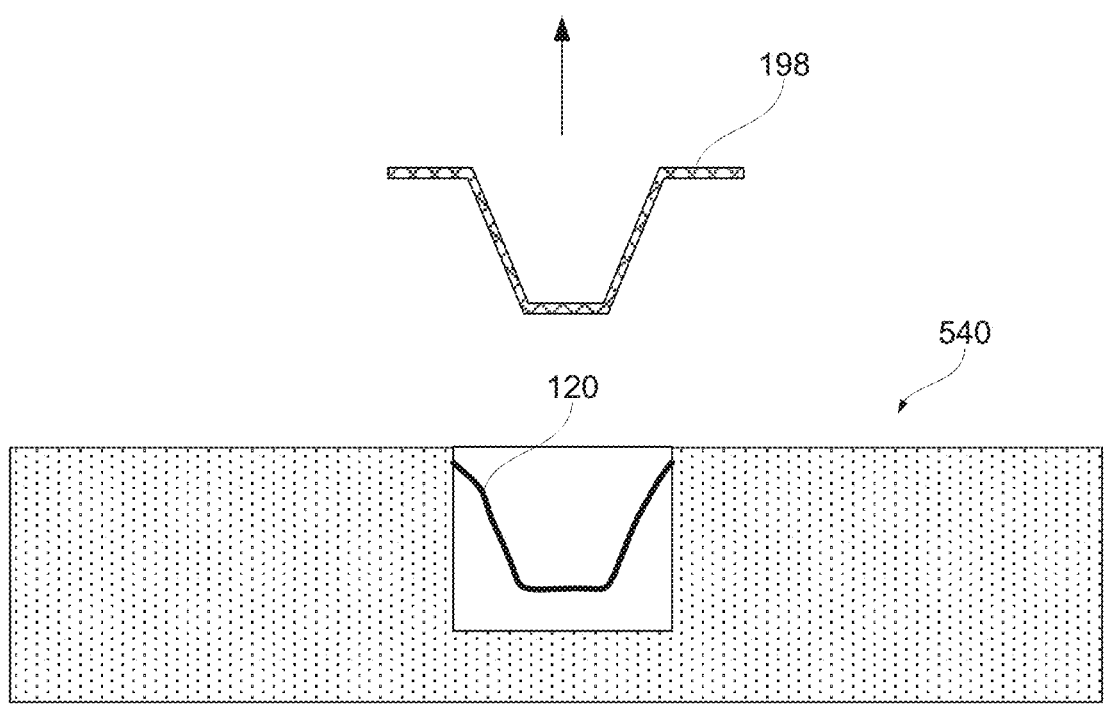
FIG. 5I is a schematic illustration of a composite stringer being removed from the curing device, in accordance with some examples of the present disclosure.

Method 400 comprises curing (block 492) pre-cured composite stringer 190 on curing device 540, thereby forming composite stringer 198 as, for example, is schematically shown in FIGS. 5H and 5I. For example, pre-cured composite stringer 190, shown in FIG. 5H, is subjected to heat and pressure to cross-link the resin within pre-cured composite stringer 190. Unlike pre-cured composite stringer 190, composite stringer 198, shown in FIG. 5I, does not require the level of support needed for pre-cured composite stringer 190. As such, post-forming processing device 100 is not used for composite stringer 198.

In some examples, various operations of method 400 are repeated (decision block 494) with additional pre-cured composite stringer 199, e.g., one example of which is shown in FIG. 1E. Specifically, additional pre-cured composite stringer 199 has a different design than pre-cured composite stringer 190, previously processed using the same post-forming processing device 100. Various different designs for pre-cured composite stringers are shown in FIGS. 1C-1E. Other example designs for the pre-cure composite stringer are possible as well.

Specifically, method 400 comprises forming 410 an additional pre-cured composite stringer 199 on an additional forming device. Unlike post-forming processing device 100, which can be universally used across a variety of different designs of pre-cured composite stringers, forming devices are dedicated tools. In some examples, support structure 120 is reformed or reshaped during this operation of forming additional pre-cured composite stringer 199. More specifically, support structure 120 has a different shape when supporting additional pre-cured composite stringer 199 than when supporting pre-cured composite stringer 190.

Method 400 proceeds with transferring (block 420) this additional pre-cured composite stringer 199 from the forming device to post-forming processing device 100. As noted above, additional pre-cured composite stringer 199 has a different design and, more specifically, a different cross-sectional profile than pre-cured composite stringer 190.

In some examples, method 400 continues with installing an additional bladder on additional pre-cured composite stringer 199, while additional pre-cured composite stringer 199 is positioned on post-forming processing device 100. Furthermore, a noodle is installed on additional pre-cured composite stringer 199, while additional pre-cured composite stringer 199 is positioned on post-forming processing device 100. However, these operations are optional.

Method 400 proceeds with transferring additional pre-cured composite stringer 199 together with additional bladder and additional noodle from post-forming processing device 100 to an additional curing device and curing pre-cured composite stringer 190 using additional curing device, thereby forming an additional composite stringer.

Figure 7:
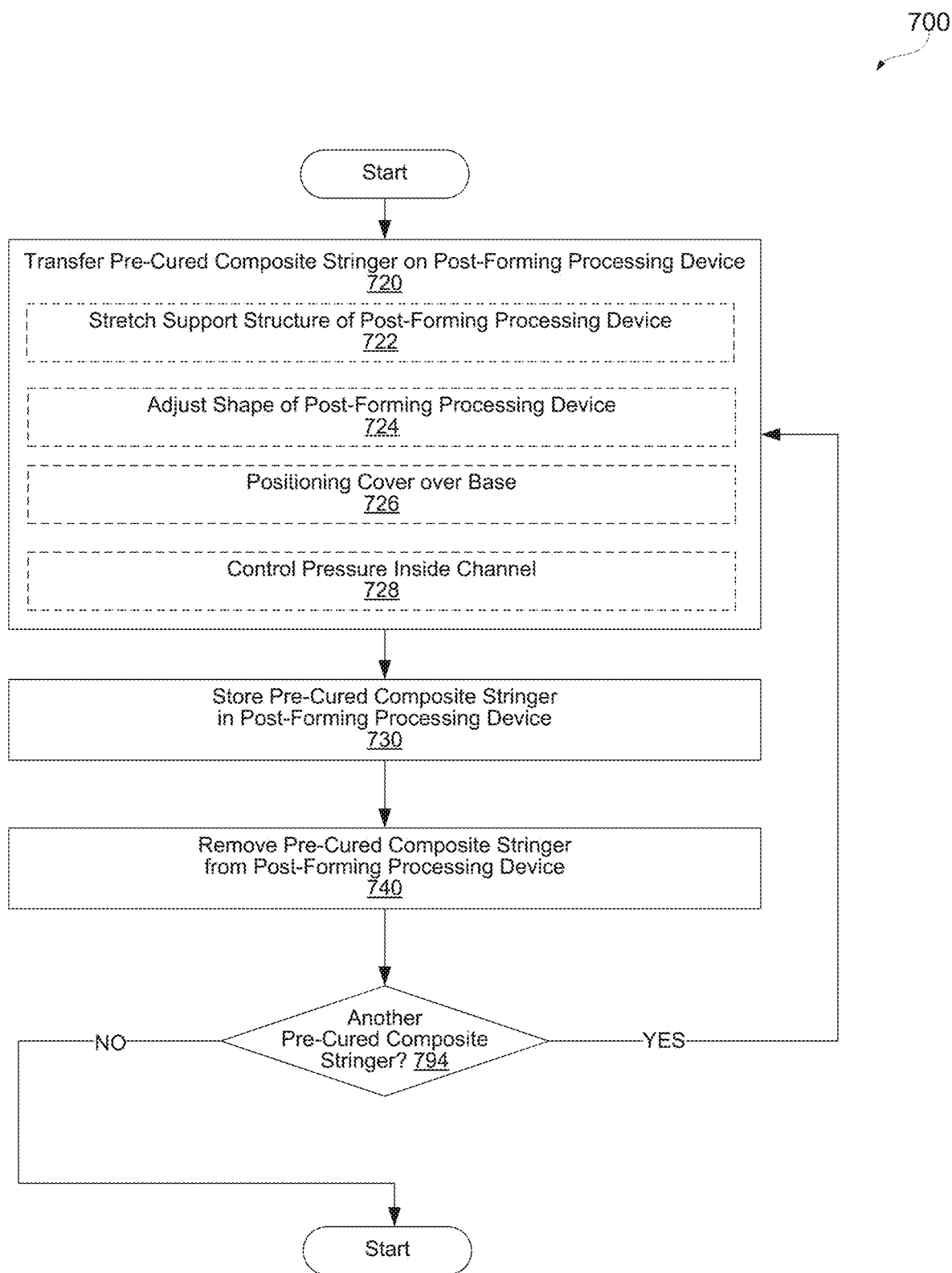
FIG. 7 is a process flowchart corresponding to a method of supporting a pre-cured composite stringer in a post-forming processing device, in accordance with some examples of the present disclosure.

FIG. 7 is a process flowchart of method 700 of supporting pre-cured composite stringer 190 using post-forming processing device 100, in accordance with some examples of the present disclosure. Method 700 comprises transferring (block 720) pre-cured composite stringer 190 to post-forming processing device 100 as, for example, is schematically shown in FIG. 5C. Various examples of pre-cured composite stringer 190 are described above. For example, pre-cured composite stringer 190 comprises comprising hat portion 191, which is supported upon the transfer of pre-cured composite stringer 190 to post-forming processing device 100. Post-forming processing device 100 comprises base 110, comprising channel 112. Post-forming processing device 100 also comprises support structure 120, at least partially extending within channel 112 and along the length of channel 112.

When pre-cured composite stringer 190 is transferred to post-forming processing device 100, support structure 120 conforming to hat portion 191 of pre-cured composite stringer 190, as for example, is schematically shown in FIG. 5C. More specifically, support structure 120 retains the cross-sectional shape of hat portion 191 of pre-cured composite stringer 190 while pre-cured composite stringer 190 is positioned in post-forming processing device 100. In some examples, support structure 120 is formed from a flexible material, providing this conformal supports. In other examples, support structure 120 is made from a jamming material that is reshaped together with each new pre-cured composite stringer.

In some examples, the transferring operation (block 720) comprises stretching (block 722) support structure 120 of post-forming processing device 100 as, for example, is schematically shown in FIGS. 2A-2B. In these examples, support structure 120 is formed from an elastic material that conforms to the shape of hat portion 191 of pre-cured composite stringer 190 as hat portion is inserted into channel 112. This stretching feature of support structure 120 allows supporting pre-cured composite stringers 190 with different sizes of hat portions 191.

In some examples, the transferring operation (block 720) comprises adjusting (block 724) the shape of post-forming processing device 100. FIGS. 6A and 6B illustrate base 110 of post-forming processing device 100, which has a pivot point, defined by first axis 601. Other components of post-forming processing device 100, such as support structure 120, are not shown for simplicity. The pivot point allows base 110 to have an in-plane bending and accommodate both straight pre-cured composite stringers (in the configuration shown in FIG. 6A) and pre-cured composite stringers with an in-plane bend (in the configurations shown in FIG. 6B). While only one pivot point is shown in FIGS. 6A and 6B, one having ordinary skill in the art would understand that any number of pivot points may be present. Furthermore, in some examples, post-forming processing device 100 has an out-of-plane bending functionality. It should be noted that some degrees of bending, especially localized bending, of pre-cured composite stringers can be accommodated by the side of channel 112 within base 110, without bending base 110.

In some examples, the transferring operation (block 720) comprises positioning (block 726) cover 130 of post-forming processing device 100 against base 110 of post-forming processing device 100 as, for example, is schematically shown in FIG. 5F. In some examples, cover 130 is sealed against base 110. Furthermore, in some examples, this cover positioning operation (block 726) compacts at least flange portions 196 of pre-cured composite stringer 190.

In some examples, the transferring operation (block 720) comprises controlling (block 728) pressure inside channel 112 of base 110. For example, inserting hat portion 191 of pre-cured composite stringer 190 into channel 112 may cause displacing of air from channel 112, e.g., through pass-through 116.

In some examples, method 700 comprises storing (block 730) pre-cured composite stringer 190. More specifically, pre-cured composite stringer 190 is stored in post-forming processing device 100 prior to removing (block 740) pre-cured composite stringer 190 from post-forming processing device 100.

Method 700 proceeds with removing (block 740) pre-cured composite stringer 190 from post-forming processing device 100. For example, pre-cured composite stringer 190 is transferred to curing device 540 as, for example, is schematically shown in FIG. 5H. Alternatively, pre-cured composite stringer 190 is transferred to other equipment, e.g., for inspection.

Figure 5J:
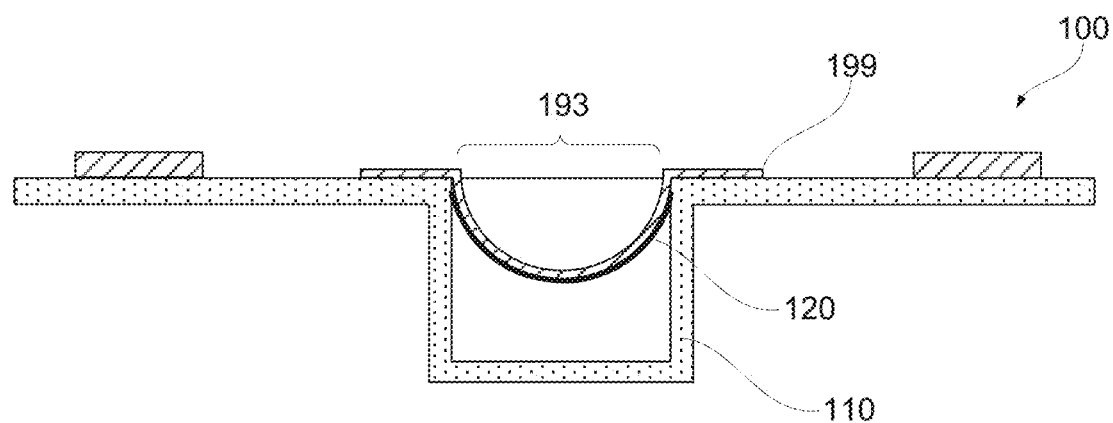
FIG. 5J is a schematic illustration of an additional pre-cured composite stringer, supported by a post-forming processing device, in accordance with some examples of the present disclosure.

Method 700 proceeds or, more specifically repeats, (decision block 794) with transferring (block 720) additional pre-cured composite stringer 199 to post-forming processing device 100 as, for example, is schematically shown in FIG. 5J. Additional pre-cured composite stringer 199 comprising additional hat portion 193, such that cross-sectional shape of additional hat portion 193 of additional pre-cured composite stringer 199, different from the cross-sectional shape of hat portion 191 of pre-cured composite stringer 190, shown in FIG. 5C. However, despite this difference in the cross-sectional shapes, support structure 120 of post-forming processing device 100 conforms to additional hat portion 193 of additional pre-cured composite stringer 199. Furthermore, support structure 120 retains the cross-sectional shape of additional hat portion 193 of additional pre-cured composite stringer 199.

Aircraft Examples

In some examples, methods and systems described above are used on aircraft and, more generally, by the aerospace industry. Specifically, these methods and systems can be used during fabrication of aircraft as well as during aircraft service and maintenance.

Figure 8:
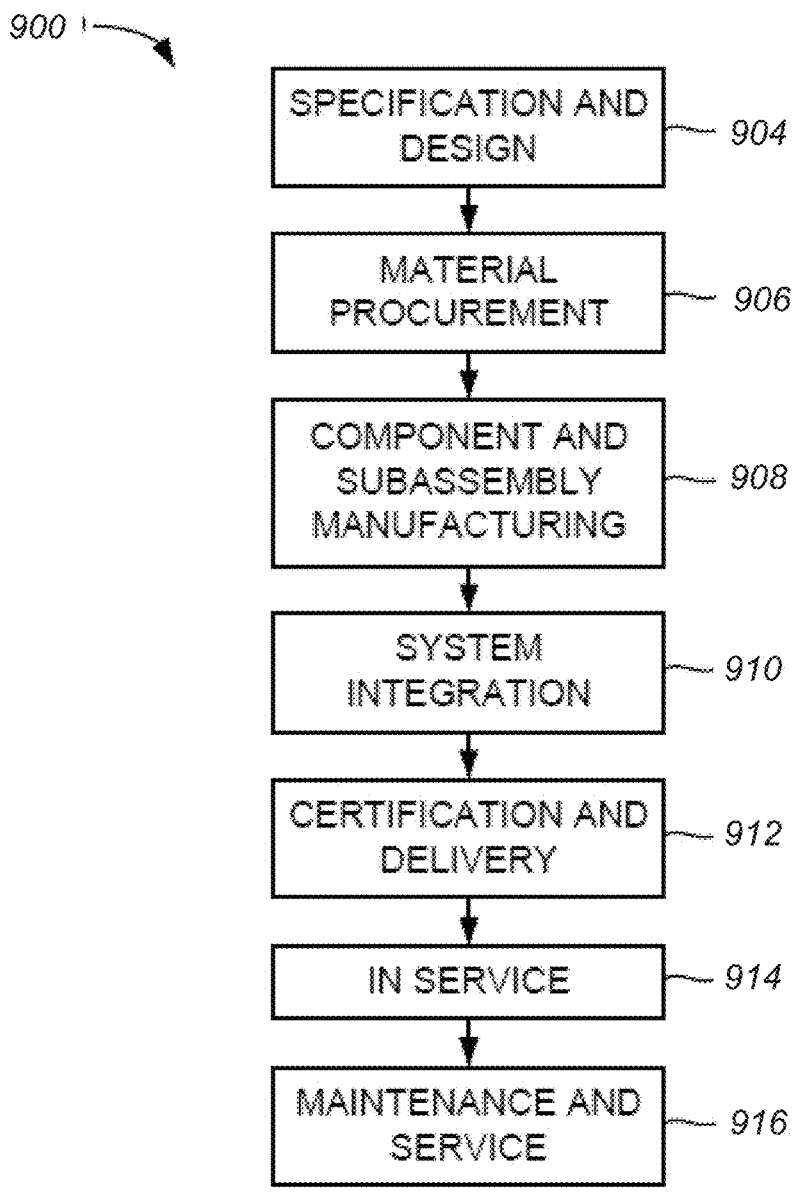
FIG. 8 is a process flowchart corresponding to a method for manufacturing and service the aircraft.
Figure 9:
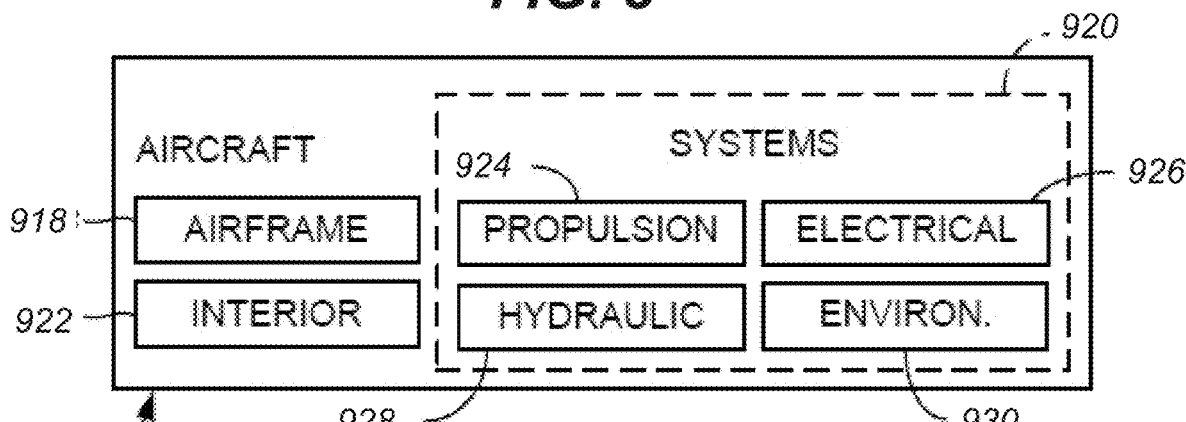
FIG. 9 illustrates a block diagram of an example of an aircraft, in accordance with some examples of the present disclosure.

Accordingly, the apparatus and methods described above are applicable for aircraft manufacturing and service method 900 as shown in FIG. 8 and for aircraft 902 as shown in FIG. 9. During pre-production, method 900 includes specification and design 904 of aircraft 902 and material procurement 906. During production, component and subassembly manufacturing 908 and system integration 910 of aircraft 902 takes place. Thereafter, aircraft 902 goes through certification and delivery 912 in order to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For the purposes of this description, a system integrator includes without limitation any number of aircraft manufacturers and major-system subcontractors; a third party includes without limitation any number of venders, subcontractors, and suppliers; and an operator can be an airline, leasing company, military entity, service organization, and so on.

As shown in FIG. 9, aircraft 902 produced by method 900 includes airframe 918 with plurality of systems 920, and interior 922. Examples of systems 920 include one or more of propulsion system 924, electrical system 926, hydraulic system 928, and environmental system 930. Any number of other systems can be included. Although an aerospace example is shown, the principles of the examples described herein is applied to other industries, such as the automotive industry.

Apparatus and methods presented herein can be employed during any one or more of the stages of method 900. For example, components or subassemblies corresponding to manufacturing 908 are fabricated or manufactured in a manner similar to components or subassemblies produced while aircraft 902 is in service. Also, one or more apparatus examples, method examples, or a combination thereof is utilized during manufacturing 908 and system integration 910, for example, by substantially expediting assembly of or reducing the cost of an aircraft 902. Similarly, one or more of apparatus examples, method examples, or a combination thereof is utilized while aircraft 902 is in service, for example and without limitation, to maintenance and service 916.

Further Examples

Further, description includes examples according to following clauses:

Clause 1. A post-forming processing device for supporting pre-cured composite stringers, comprising hat portions, having cross-sections, different among the pre-cured composite stringers, the post-forming processing device comprising:
  a base, comprising a channel, having a channel width and a channel height, wherein:
    the channel width is larger than a width of the hat portions of the pre-cured composite stringers, and
    the channel height is larger than heights of the hat portions of the pre-cured composite stringers;
  a support structure, at least partially extending within the channel and along a length of the channel and configured to conform to each of the hat portions and to retain a cross-sectional shape of each of the hat portions when a corresponding one of the pre-cured composite stringers is supported by the post-forming processing device; and
  a cover, configured to attach to the base, such that the corresponding one of the pre-cured composite stringers is positioned between the cover and the base while supported by the post-forming processing device.

Clause 2. The post-forming processing device of clause 1, wherein the support structure is formed from an elastic material configured to change shape when conforming to each of the hat portions.

Clause 3. The post-forming processing device of clause 2, wherein the support structure is attached to the base at side walls of the channel.

Clause 4. The post-forming processing device of any one of clauses 1-3, wherein the support structure comprises a jamming material or a plastically deformable material.

Clause 5. The post-forming processing device of clause 4, wherein the support structure is co-formed with the corresponding one of the pre-cured composite stringers.

Clause 6. The post-forming processing device of clause 4, wherein the support structure comprises support flanges extending over a support surface of the base and outside the channel.

Clause 7. The post-forming processing device of clause 4, wherein the support structure is removable from the base.

Clause 8. The post-forming processing device of any one of clause 1-7, wherein the base comprising a pass-through, fluidically coupled with the channel and configured to control pressure inside the channel.

Clause 9. The post-forming processing device of any one of clauses 1-8, further comprising a flexible insert, positioned with the channel and under the support structure.

Clause 10. The post-forming processing device of any one of clause 1-10, wherein the cover is configured to seal against the base.

Clause 11. A method of fabricating a composite stringer, the method comprising:
  forming a pre-cured composite stringer on a forming device, the pre-cured composite stringer comprising a hat portion;
  transferring the pre-cured composite stringer from the forming device to a post-forming processing device, comprising:
    a base, comprising a channel, and
    a support structure, at least partially extending within the channel and along a length of the channel and conforming to the hat portion and retaining a cross-sectional shape of the hat portion; and installing a bladder on the pre-cured composite stringer, while the pre-cured composite stringer is positioned on the post-forming processing device;

installing a noodle at an interface between the bladder and the pre-cured composite stringer and within a plane of a support surface of the base, while the pre-cured composite stringer is positioned on the post-forming processing device;

transferring the pre-cured composite stringer together with the bladder and the noodle from the post-forming processing device to a curing device; and curing the pre-cured composite stringer on the curing device, thereby forming the composite stringer.

Clause 12. The method of clause 11, further comprising inspecting the pre-cured composite stringer, while the pre-cured composite stringer is positioned on the post-forming processing device.

Clause 13. The method of any one of clauses 11-12, further comprising compacting the pre-cured composite stringer, while the pre-cured composite stringer is positioned on the post-forming processing device.

Clause 14. The method of clause 13, wherein compacting the pre-cured composite stringer comprises sealing a cover of the post-forming processing device against the base of the post-forming processing device.

Clause 15. The method of clause 14, wherein compacting the pre-cured composite stringer further comprises contacting at least flange portions of the pre-cured composite stringer with the cover of the post-forming processing device.

Clause 16. The method of any one of any one of clauses 11-15, wherein forming the pre-cured composite stringer on the forming device comprises forming the support structure of the post-forming processing device.

Clause 17. The method of any one of clauses 11-16, wherein transferring the pre-cured composite stringer from the forming device to the post-forming processing device comprises controlling pressure inside the channel of the base.

Clause 18. The method of any one of clause 11-17, wherein transferring the pre-cured composite stringer from the forming device to the post-forming processing device comprises stretching the support structure of the post-forming processing device.

Clause 19. The method of any one of clauses 11-18, further comprising:

forming an additional pre-cured composite stringer on an additional forming device;

transferring the additional pre-cured composite stringer from the forming device to the post-forming processing device, wherein the additional pre-cured composite stringer has a different cross-sectional profile from the pre-cured composite stringer;

installing an additional bladder on the additional pre-cured composite stringer, while the additional pre-cured composite stringer is positioned on the post-forming processing device;

installing an additional noodle on the additional pre-cured composite stringer, while the additional pre-cured composite stringer is positioned on the post-forming processing device;

transferring the additional pre-cured composite stringer together with the additional bladder and the additional noodle from the post-forming processing device to an additional curing device; and curing the pre-cured composite stringer using the additional curing device, thereby forming an additional composite stringer.

Clause 20. The method of clause 19, wherein the support structure has a different shape when supporting the additional pre-cured composite stringer than when supporting the pre-cured composite stringer.

Clause 21. A method comprising:

transferring a pre-cured composite stringer, comprising a hat portion, to a post-forming processing device, comprising:

a base, comprising a channel, and a support structure, at least partially extending within the channel and along a length of the channel and conforming to the hat portion of the pre-cured composite stringer and retaining a cross-sectional shape of the hat portion of the pre-cured composite stringer; and removing the pre-cured composite stringer from the post-forming processing device; and transferring an additional pre-cured composite stringer, comprising an additional hat portion, to the post-forming processing device, wherein the support structure of the post-forming processing device conforms to the additional hat portion of the additional pre-cured composite stringer and retains a cross-sectional shape of the additional hat portion of the additional pre-cured composite stringer, different from the cross-sectional shape of the hat portion of the pre-cured composite stringer.

Clause 22. The method of clause 21, wherein transferring the pre-cured composite stringer comprises positioning a cover of the post-forming processing device against the base of the post-forming processing device.

Clause 23. The method of any one of clauses 21-22, wherein transferring the pre-cured composite stringer to the post-forming processing device comprises controlling pressure inside the channel of the base.

Clause 24. The method of any one of clause 21-23, wherein transferring the pre-cured composite stringer to the post-forming processing device comprises stretching the support structure of the post-forming processing device.

Clause 25. The method of any one of clauses 21-24, wherein the post-forming processing device is used for storing the pre-cured composite stringer prior to removing the pre-cured composite stringer from the post-forming processing device.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A post-forming processing device for supporting pre-cured composite stringers, comprising hat portions having different cross-section shapes among the pre-cured composite stringers, the post-forming processing device comprising:

a base, comprising a channel, having a channel width and a channel height, wherein:

the channel width is larger than a width of the hat portions of the pre-cured composite stringers, and the channel height is larger than heights of the hat portions of the pre-cured composite stringers;

a support structure, at least partially extending within the channel and along a length of the channel and configured to conform to each of the hat portions and to be reshaped for each different cross-section shape of each of the hat portions when a corresponding one of the pre-cured composite stringers is supported by the post-forming processing device; and a cover, configured to attach to the base, such that the corresponding one of the pre-cured composite stringers is positioned between the cover and the base while supported by the post-forming processing device.

2. The post-forming processing device of claim 1, wherein the support structure is formed from an elastic material configured to change shape to conform to at least a side portion and a base portion of each of the hat portions' different cross-section shape when conforming to each of the hat portions.

3. The post-forming processing device of claim 2, wherein the support structure is attached to the base at side walls of the channel.

4. The post-forming processing device of claim 1, wherein the support structure comprises a jamming material or a plastically deformable material.

5. The post-forming processing device of claim 4, wherein the support structure is co-formed with the corresponding one of the pre-cured composite stringers.

6. The post-forming processing device of claim 4, wherein the support structure comprises support flanges extending over a support surface of the base and outside the channel.

7. The post-forming processing device of claim 4, wherein the support structure is removable from the base.

8. The post-forming processing device of claim 1, wherein the base comprising a pass-through, fluidically coupled with the channel and configured to control pressure inside the channel.

9. The post-forming processing device of claim 1, further comprising a flexible insert, positioned with the channel and under the support structure.

10. The post-forming processing device of claim 1, wherein the cover is configured to seal against the base.

11. The post-forming processing device of claim 1, wherein the support structure is configured to conform to at least a side portion and a bottom portion of each of the hat portions when a corresponding one of the pre-cured composite stringers is supported by the post-forming processing device.

12. The post-forming processing device of claim 1, wherein the different cross-section shapes of the hat portions include a trapezoid cross-section shape and a semi-circle cross-section shape.

13. The post-forming processing device of claim 1, wherein the support structure attaches at an upper portion of the channel's sidewalls and extends to a lower portion of the channel.

14. The post-forming processing device of claim 1, wherein the support structure is configured to retain each different cross-section shape of each of the hat portions when a corresponding one of the pre-cured composite stringers is supported by the post-forming processing device.

15. The post-forming processing device of claim 1, wherein the channel width is larger than a widest width of the hat portions.

16. The post-forming processing device of claim 1, wherein the channel height is larger than a tallest height of the hat portions.

17. The post-forming processing device of claim 1, wherein the support structure comprises a latex or silicone material.

18. The post-forming processing device of claim 1, wherein the different cross-section shapes include a tapered profile and a rounded profile.

19. The post-forming processing device of claim 1, wherein the support structure is configured to conform to each of the hat portions that protrude into the channel.

20. The post-forming processing device of claim 1, wherein the support structure is configured to change shape with each hat portion having a different shaped profile.

* * * * *